US 12,417,155 B2

United States Patent
Chakravarthi Konduru et al.

(10) Patent No.: US 12,417,155 B2
(45) Date of Patent: Sep. 16, 2025

(54) FAILURE RECOVERY IN A FAULT TOLERANT ARCHITECTURE

(71) Applicant: Chicago Mercantile Exchange Inc., Chicago, IL (US)

(72) Inventors: Dileep Chakravarthi Konduru, Naperville, IL (US); Priteshkumar Soni, Naperville, IL (US); Arkadiusz Koziol, Glenview, IL (US); Matthew Coffey, Chicago, IL (US); Nagesh Reddy, Elm Grove, WI (US); Satya Kamineni, Lockport, IL (US); Madhur Sirohi, Aurora, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 18/399,922

(22) Filed: Dec. 29, 2023

(65) Prior Publication Data
US 2025/0217244 A1    Jul. 3, 2025

(51) Int. Cl.
G06F 11/20 (2006.01)
G06F 11/14 (2006.01)

(52) U.S. Cl.
CPC ...... *G06F 11/2023* (2013.01); *G06F 11/1443* (2013.01); *G06F 11/1464* (2013.01)

(58) Field of Classification Search
CPC ............. G06F 11/2023; G06F 11/1443; G06F 11/1464
See application file for complete search history.

(56) References Cited

U.S. PATENT DOCUMENTS

| | | | |
|---|---|---|---|
| 4,228,496 A | 10/1980 | Katzman et al. | |
| 4,590,554 A | 5/1986 | Glazer et al. | |
| 5,022,076 A * | 6/1991 | Rosenow | G06Q 20/382 705/64 |
| 5,363,503 A | 11/1994 | Gleeson | |

(Continued)

FOREIGN PATENT DOCUMENTS

| | | | | |
|---|---|---|---|---|
| CN | 1728697 A | 2/2006 | | |
| EP | 2439881 A1 * | 4/2012 | ......... | H04L 67/1002 |
| WO | WO-2017023244 A1 * | 2/2017 | ............. | G06F 11/07 |

OTHER PUBLICATIONS

W. Zhao, L. E. Moser and P. M. Melliar-Smith, "Unification of replication and transaction processing in three-tier architectures," Proceedings 22nd International Conference on Distributed Computing Systems, Vienna, Austria, 2002, pp. 290-297 (Year: 2002).*

(Continued)

*Primary Examiner* — Matthew M Kim
*Assistant Examiner* — Indranil Chowdhury
(74) *Attorney, Agent, or Firm* — Lempia Summerfield Katz LLC

(57) ABSTRACT

A system/process provides fault tolerance to an integrated component system which integrates core components of a transaction processing system into a single processing platform, i.e., a single server, enabling elimination of the network interconnects and associated latencies introduced thereby in favor of much faster interconnects, such as inter-process communication and shared memory communication messaging, where a failure of any one component necessitates failing over the entire system to a backup thereof.

27 Claims, 23 Drawing Sheets

(56) References Cited

U.S. PATENT DOCUMENTS

| | | | |
|---|---|---|---|
| 5,621,885 A | 4/1997 | Del, Jr. | |
| 6,324,654 B1 | 11/2001 | Wahl et al. | |
| 6,691,257 B1* | 2/2004 | Suffin | G06F 11/2007 |
| | | | 714/43 |
| 6,954,877 B2 | 10/2005 | Earl et al. | |
| 6,978,396 B2 | 12/2005 | Ruuth et al. | |
| 7,434,096 B2 | 10/2008 | Callaway et al. | |
| 7,480,827 B2 | 1/2009 | Callaway et al. | |
| 8,191,078 B1* | 5/2012 | Cullen | H04L 67/1095 |
| | | | 714/4.11 |
| 8,295,813 B2* | 10/2012 | Aalto | H04L 67/1001 |
| | | | 455/412.1 |
| 9,691,102 B2 | 6/2017 | Studnitzer et al. | |
| 2003/0009707 A1 | 1/2003 | Pedone et al. | |
| 2007/0180302 A1* | 8/2007 | Allen | G06F 11/2071 |
| | | | 714/E11.08 |
| 2008/0126853 A1* | 5/2008 | Callaway | G06F 11/1695 |
| | | | 714/13 |
| 2010/0017647 A1* | 1/2010 | Callaway | G06F 11/1641 |
| | | | 714/48 |
| 2010/0100475 A1* | 4/2010 | Callaway | G06F 11/1641 |
| | | | 705/37 |
| 2011/0041006 A1 | 2/2011 | Fowler | |
| 2016/0110263 A1* | 4/2016 | Tracht | G06F 11/1435 |
| | | | 714/6.23 |
| 2017/0123929 A1* | 5/2017 | Helleren | G06F 9/5088 |
| 2018/0167492 A1* | 6/2018 | Bonig | G06Q 40/04 |
| 2019/0391741 A1* | 12/2019 | Barinov | G06F 11/2038 |
| 2020/0050523 A1* | 2/2020 | Pawlowski | G06F 13/4022 |

OTHER PUBLICATIONS

G. Su and A. Iyengar, "A highly available transaction processing system with non-disruptive failure handling," 2012 IEEE Network Operations and Management Symposium, Maui, HI, USA, 2012, pp. 409-416 (Year: 2012).*

Kumari et al., "A survey of fault tolerance in cloud computing", Journal of King Saud University—Computer and Information Sciences 33 (2021) 1159-1176, availabe online Oct. 1, 2018, 18 pages.

Extended European Search Report in European Patent Application No. 24218848.0, dated May 19, 2025, 14 pages.

Pedone et al: "Pronto: High availability for standard off-the-shelfdatabases", Journal of Parallel and Distributed Computing, Elsevier, Amsterdam, NL, vol. 68, No. 2, Jan. 5, 2008 (Jan. 5, 2008), pp. 150-164, XP022410959, ISSN: 0743-7315, DOI: 10.1016/J.JPDC.2007.08.001.

* cited by examiner

Input Message Flow into Primary Instance

Input Message Flow into Backup Instance

OUTBOUND MESSAGE FLOW FROM PRIMARY INSTANCE

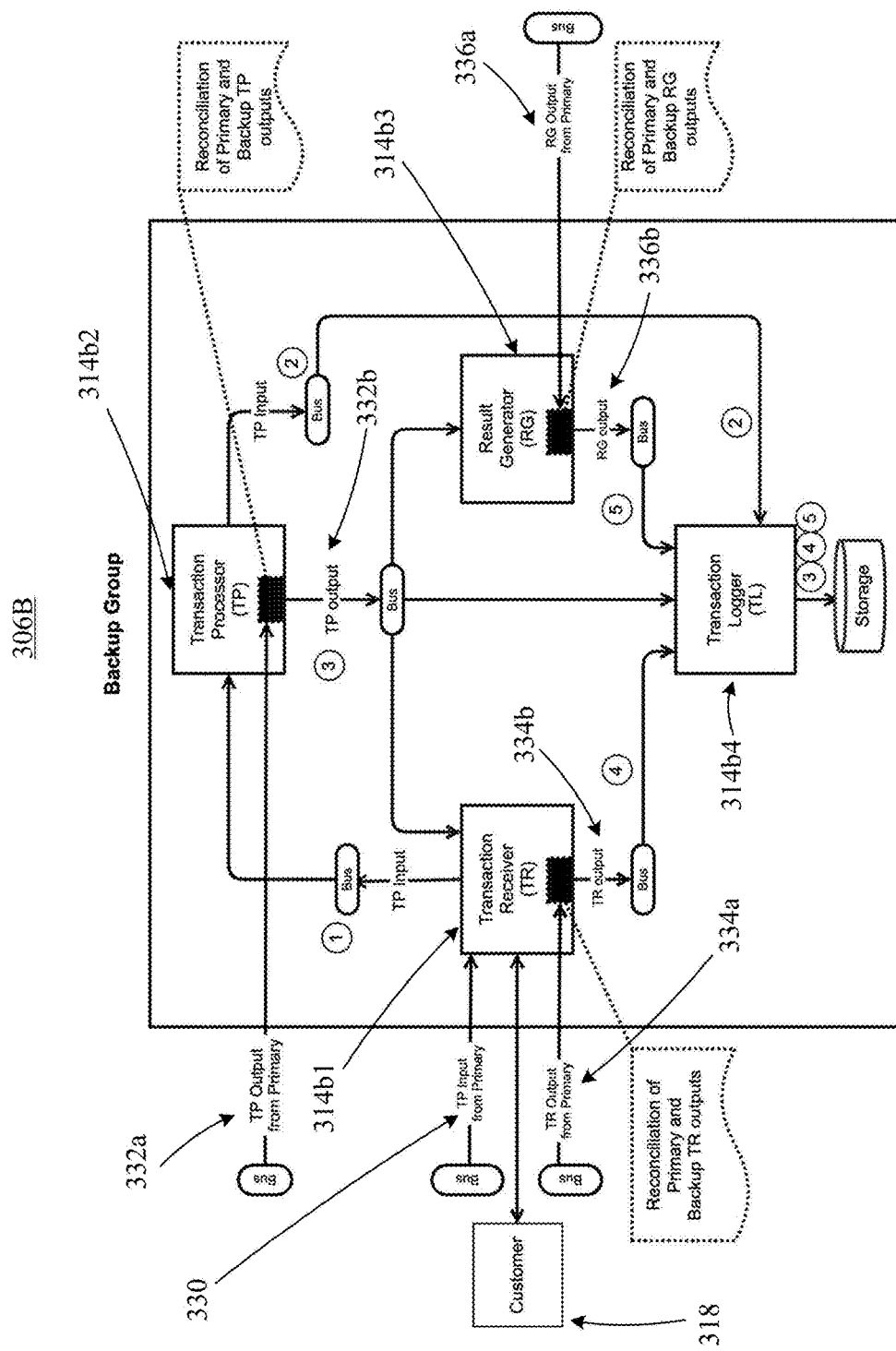
FIG. 9 OUTBOUND MESSAGE FLOW FROM BACKUP INSTANCE

PRIMARY INSTANCE START UP SEQUENCE

START UP SEQUENCE OF BACKUP INSTANCE
STAGES 1 and 2

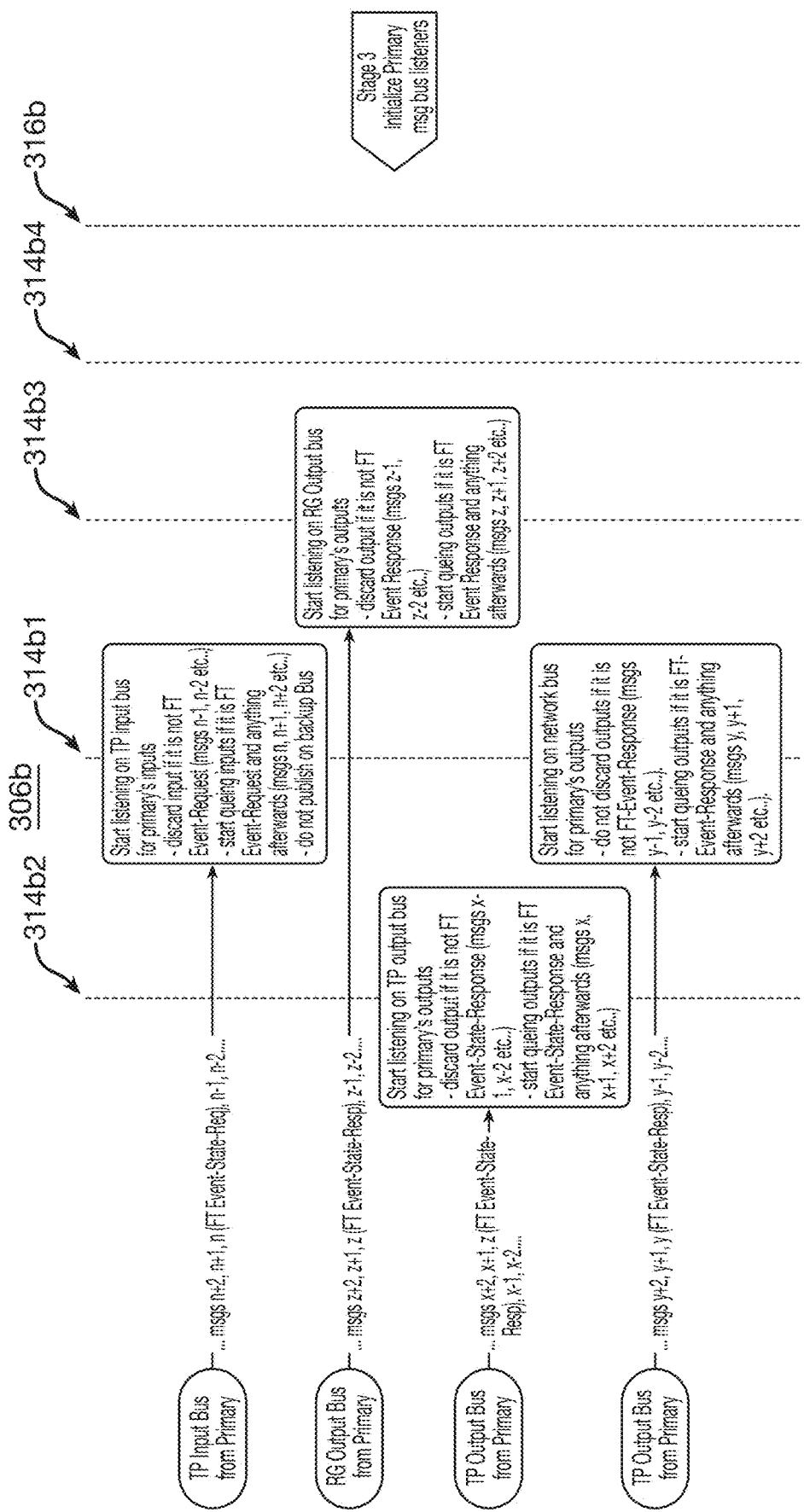

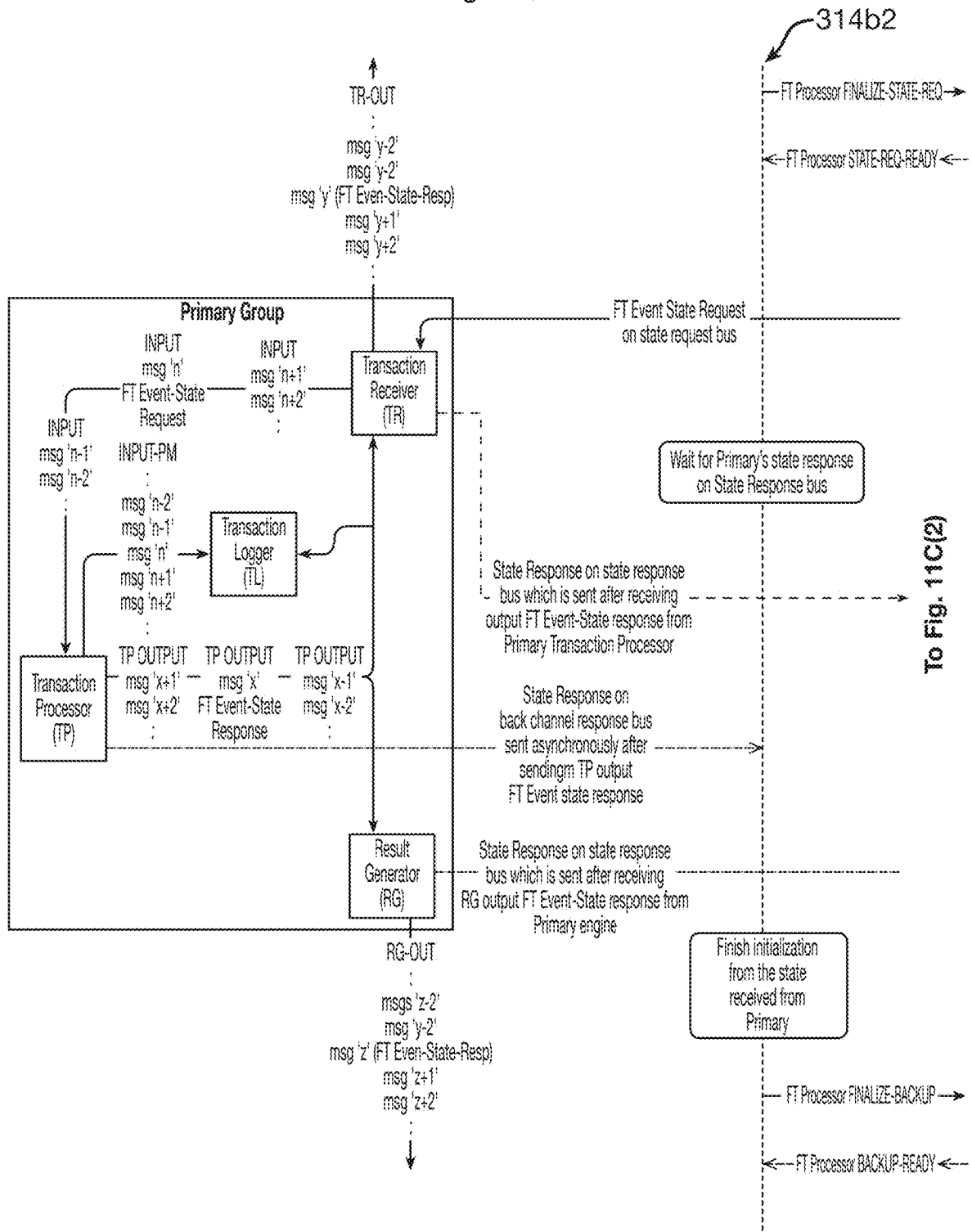
FIG. 11C(1) — START UP SEQUENCE OF BACKUP INSTANCE STAGES 4-7

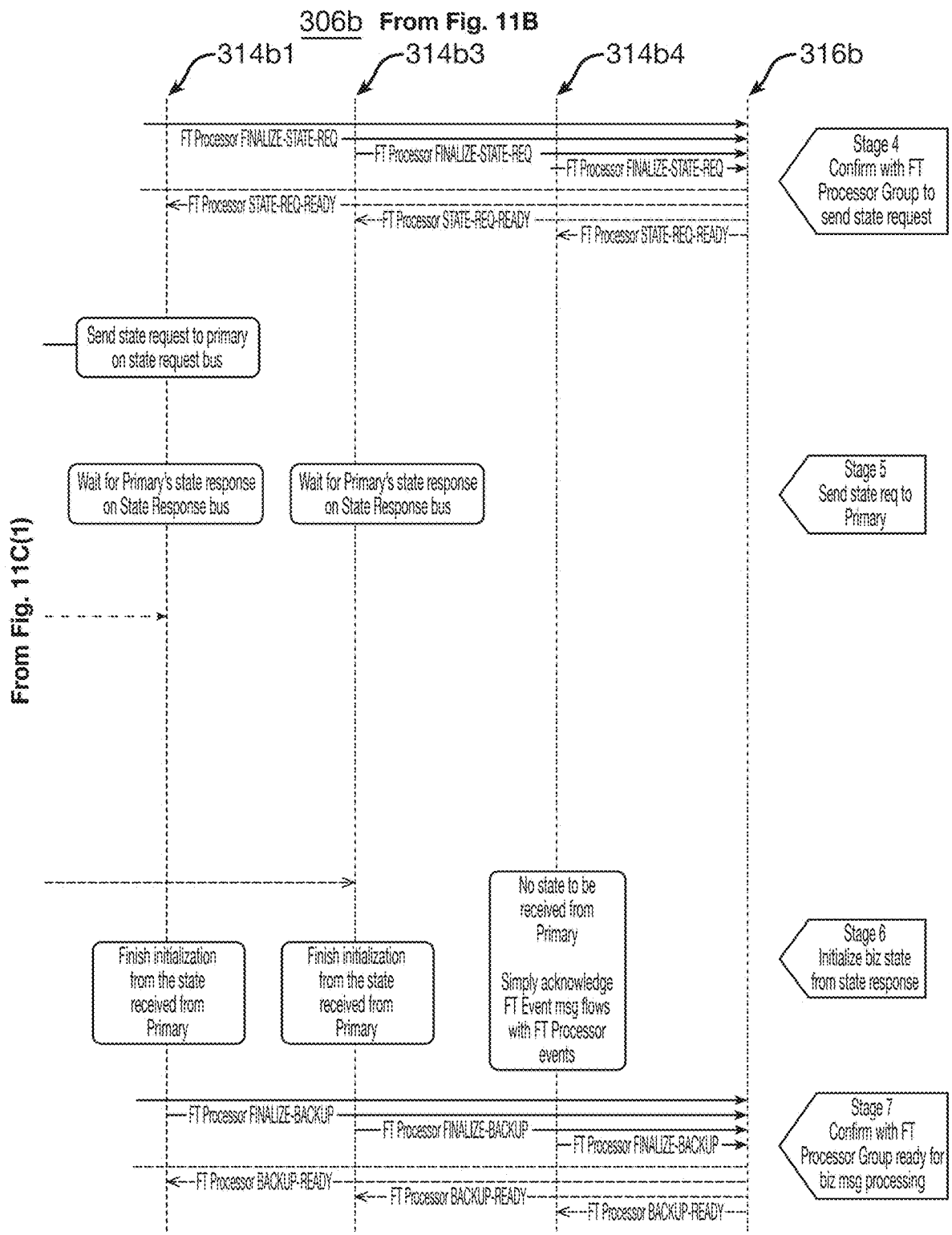
FIG. 11C(2)
START UP SEQUENCE OF BACKUP INSTANCE
STAGES 4-7

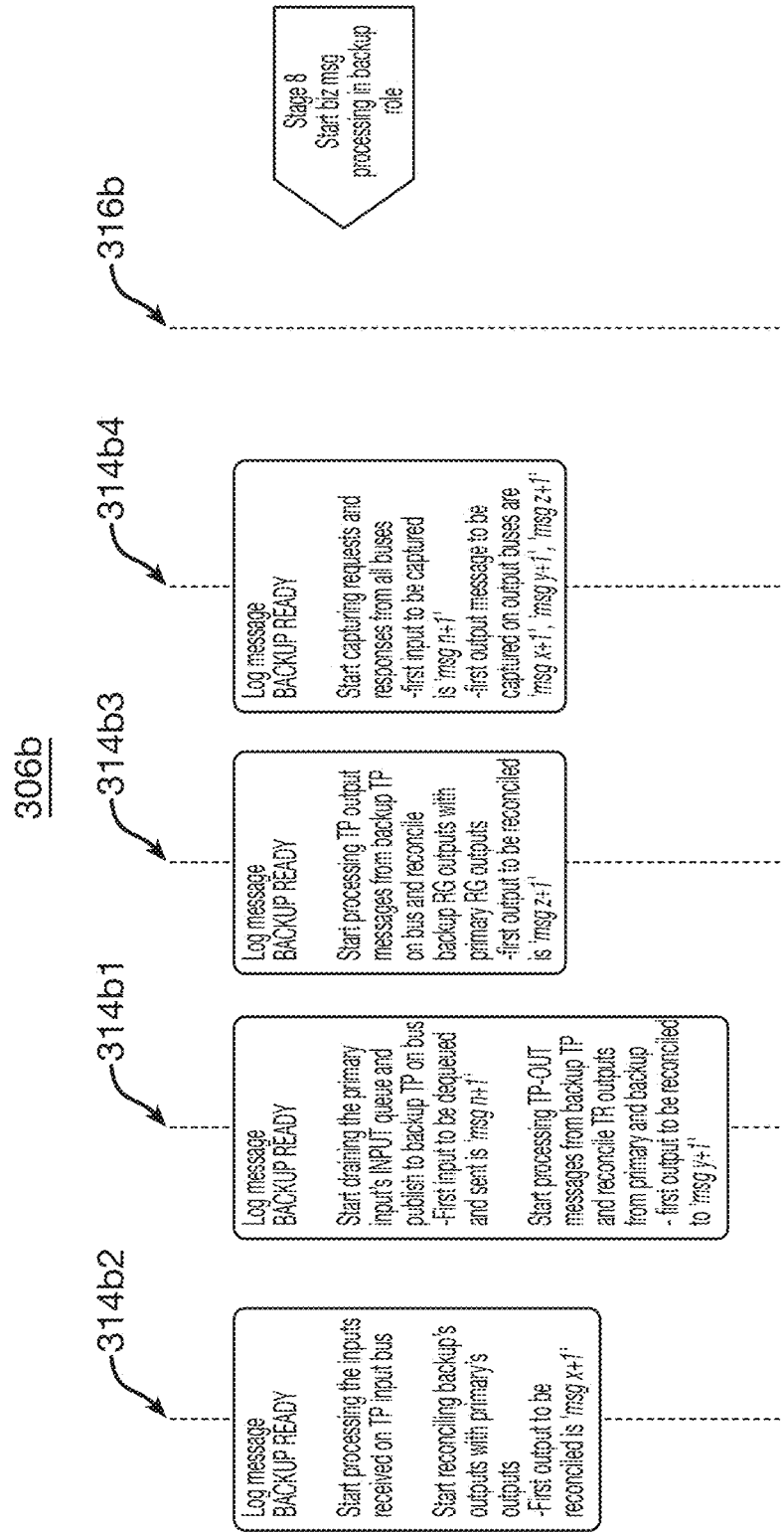

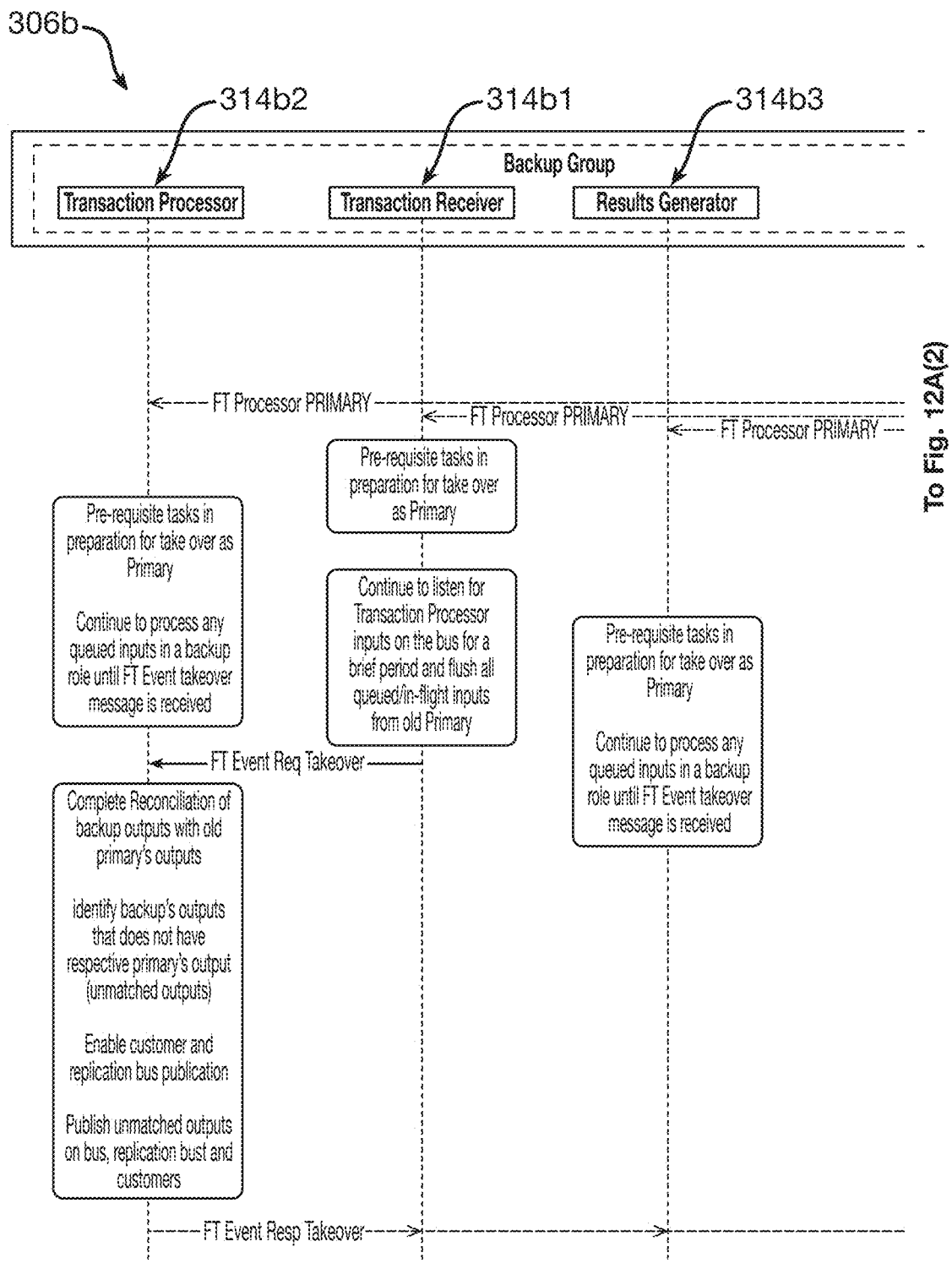
FIG. 12A(1)

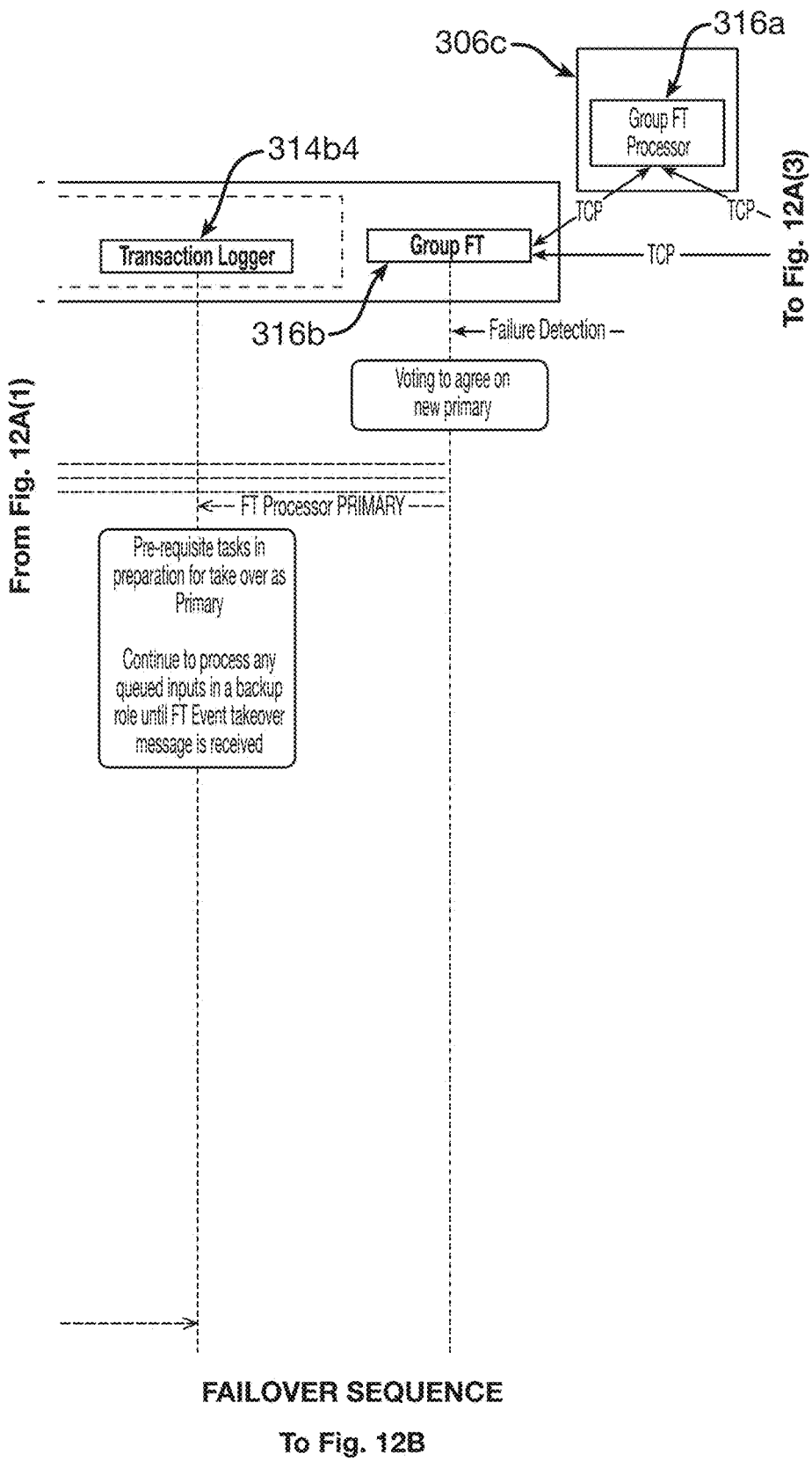
FIG. 12A(2)

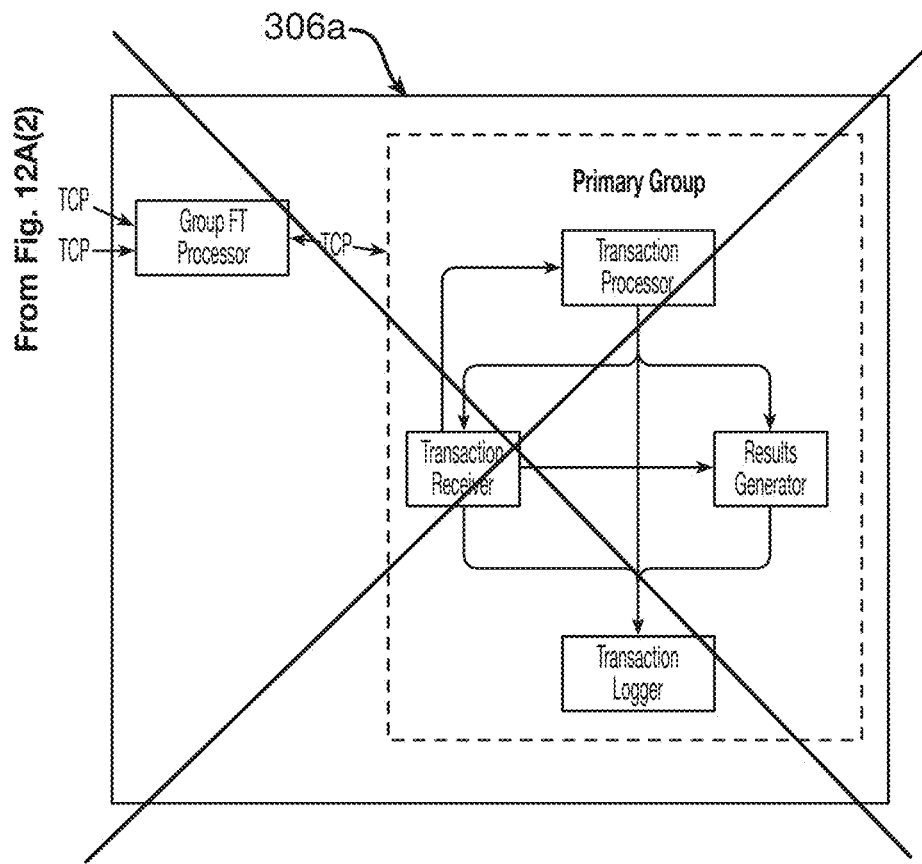
FAILOVER SEQUENCE
To Fig. 12B
FIG. 12A(3)

FAILOVER SEQUENCE

FAILURE RECOVERY IN A FAULT TOLERANT ARCHITECTURE

CROSS REFERENCE TO RELATED APPLICATIONS

The present patent application is related to co-pending U.S. patent application Ser. No. 18/399,917, filed contemporaneously herewith, entitled "FAULT TOLERANT ARCHITECTURE," the entire disclosure of which is incorporated by reference herein.

BACKGROUND

Fault Tolerance is generally regarded as the ability to mask, or recover from, erroneous conditions in a system once an error has been detected. Fault tolerance is typically required for mission critical systems/applications. Mission critical typically refers to any indispensable operation that cannot tolerate intervention, compromise, or shutdown during the performance of its critical function, e.g., any computer process that cannot fail during normal business hours. Examples of mission critical environments include business-essential process control, finance, such as the electronic trading systems described herein, health, safety, and security. These environments typically monitor, store, support and communicate data that cannot be lost or corrupted without compromising their core function.

With respect to financial applications and electronic trading in particular, in addition to increased capacity and lower latency, the global nature of electronic trading systems has further driven a need for fault tolerance to increase their availability and reliability. Consistent reliable operation may be critical to ensuring market stability, reliability, and acceptance. Therefore, scheduled outages should be minimized and unscheduled outages should be eliminated.

In particular, critical applications/systems such as electronic trading systems often feature failure/disaster recovery mechanisms which allows the most current pre-failure state of a primary instance of the application/system, e.g., the state of the database thereof, to be recovered, restored, replicated and/or restarted, etc. in the event of an otherwise uncorrectable or unrecoverable temporary or permanent failure of one or more components of the primary instance of the application/system or the entirety thereof, or one or more components of the infrastructure upon which the primary instance is implemented. The state of the system often refers to the state of the most recent committed transaction prior to the failure.

These failure recovery mechanisms may take the form of a backup component provided for each of one or more components of the primary instance. One type of backup may provide a fully redundant copy/instance of each of the one or more components of the primary instance, including any databases used thereby, which receives copies of all inputs to the primary instance and processes those inputs upon receipt and stores the results just as the primary instance would but, for example, reserving its outputs rather than sending them on to the consumers of those outputs, etc., e.g., to avoid delivering duplicates of the outputs of the primary instance during normal operations. While potentially more expensive, with this type of backup system, when a component of the primary instance fails, the backup component can simply be switched over to be used in its place, with some caveats. This may provide for a faster and/or more reliable recovery after a failure occurs. Another type of backup may simply comprise a database or other storage which stores copies of the inputs to the primary instance along with the outputs generated thereby or otherwise a log of which inputs were successfully processed by the primary instance, referred to as a storage-based backup system, such that when the primary instance fails and a backup instance is started, the backup store need only be consulted to determine which inputs were received but not completely processed by the primary instance, i.e., due to the failure, and therefore need to be re-processed by the backup instance before it can assume normal processing of newly received inputs.

When implementing a backup system/instance, the operator needs to consider where to locate, physically and/or logically, that backup system relative to the primary instance and the source of inputs thereto. For example, in the case of physical infrastructure issues or natural disasters which may affect the geographic location of the primary instance, one would not want the backup system to be physically located in the same geographic areas as then it may be vulnerable to the same issues, thereby reducing the effectiveness of the backup system. Accordingly, most operators locate their backup systems in different geographic regions from where the primary instance is located to minimize the chance that both systems will experience failures due to the same cause. It will be appreciated that many operators deploy multiple backup systems located in disparate geographic regions to further minimize the likelihood of the same event compromising both the primary instance and the availability of at least one backup system.

However, locating the backup system in a geographic location different from where the primary instance is located creates a latency issue with regard to communication of the transactional inputs to both systems to assure that the backup system is synchronized with the primary system should the backup system need to take over, i.e., to minimize transaction reprocessing or loss. One solution may be to receive the transactional inputs from their source at a location that is equidistant, or otherwise subject to substantially equal/symmetric communications latencies, to both the primary instance and the backup system, where the transactions are then relayed to both systems from this equidistant location. However, for storage-based backup systems, checkpoints from the primary instance may still need to be periodically communicated between the primary instance and the backup system to minimize the extent to which inputs need to be reprocessed when a failure occurs. Furthermore, in latency sensitive applications, such as financial transaction processing, e.g., electronic trading, it may be necessary to locate the primary instance close to the source of transactions sent thereto so as to minimize the operational latency of the application/system. This may necessarily mean the backup system has to be located further from that source of transactions.

Accordingly, it is desirable to provide for fault tolerance of a high performance electronic trading system which minimizes recovery time and performance degradation in fail over scenarios.

BRIEF DESCRIPTION OF THE DRAWINGS

FIG. 9 depicts a block diagram of the outbound message flow from the backup instance according to some embodiments.

FIGS. 11A-11D depict a sequence diagram of a startup sequence of a backup instance according to one embodiment.

DETAILED DESCRIPTION

Figure 1:
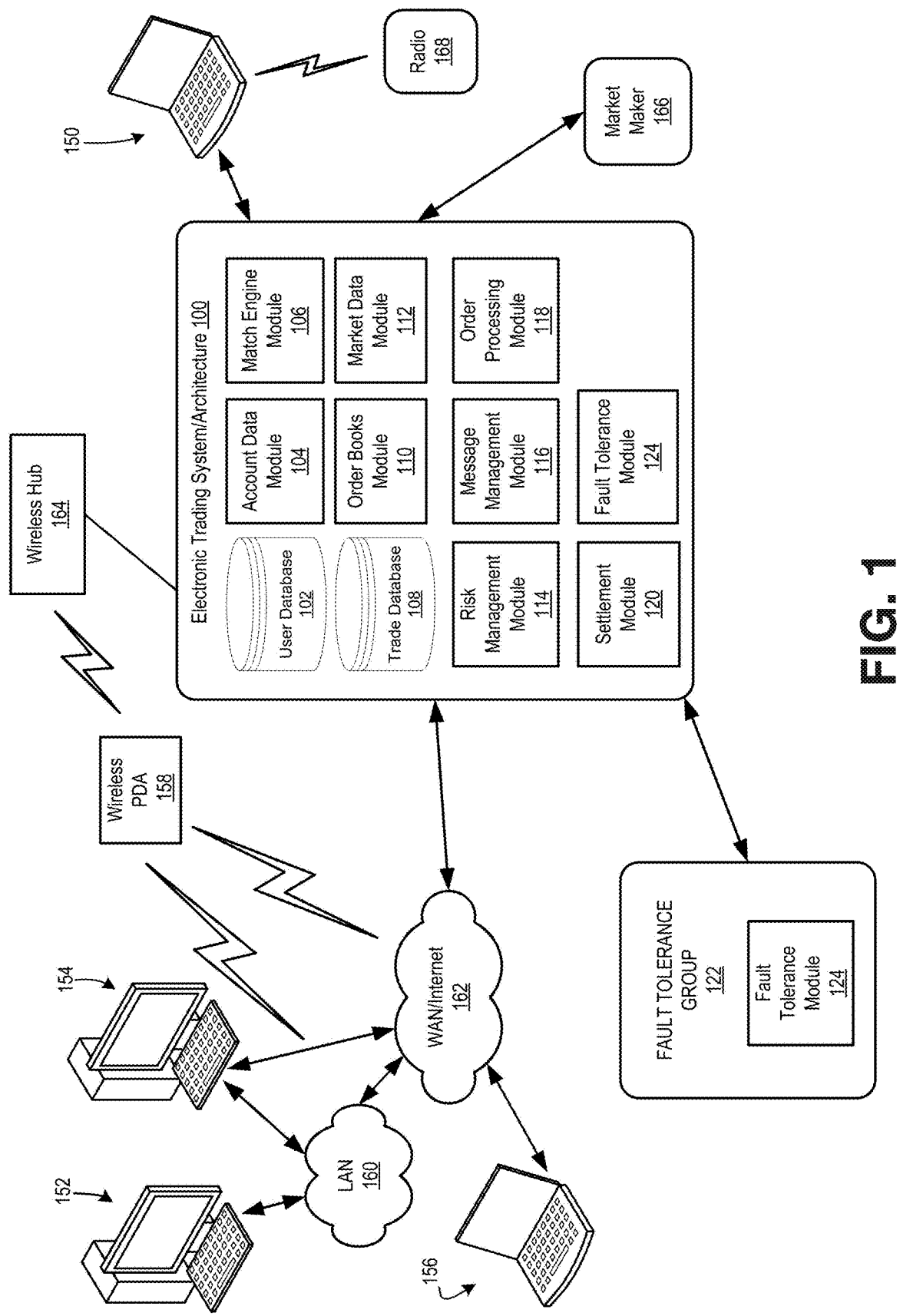
FIG. 1 depicts an exchange computer and network system, according to some embodiments.

The disclosed embodiments relate to a system/process that provides fault tolerance to an integrated component system which integrates core components of a transaction processing system into a single effective processing platform, e.g., a single or multi-processor/core server or tightly coupled set of single and/or multi-processor/core servers, enabling elimination of the network interconnects and associated latencies introduced in typical distributed processing systems in favor of much faster interconnects, such as inter-process communication, direct interconnect and shared memory communication messaging, where a failure of any one component typically necessitates failing over the entire system to a backup thereof.

As will be discussed, the integrated implementation of the disclosed transaction processing system implicates the ability to provide redundancy for any one component thereof as the use of component level backup instances, typically, as described above, located remote from the primary instance to assure the reliability/availability thereof, would require, in a failover situation, that the correctly operating components now communicate with the backup instance of the failed component over a network or other interconnect which necessarily has a larger communications latency with the still functioning components than the failed component had, necessarily impacting performance. Furthermore, in an integrated implementation many types of faults which might impact one component are likely to impact all components, e.g., compromises to operating power or network connectivity.

A financial instrument trading system, such as a futures exchange, referred to herein also as an "Exchange", such as the Chicago Mercantile Exchange Inc. (CME), provides a contract market where financial instruments, for example futures, options on futures and spread contracts, are traded among market participants, e.g., traders, brokers, etc.

Current financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e., a trading pit, and trade with each other via oral and visual/hand based communication.

Typically, the Exchange provides for centralized "clearing" by which all trades are confirmed and matched, and open positions are settled each day until expired (such as in the case of an option), offset or delivered. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

In particular, electronic trading of financial instruments, such as futures contracts, is conducted by market participants sending trading orders, such as to buy or sell one or more futures contracts, in electronic form to the Exchange. These electronically submitted orders to buy, and sell are then matched, if possible, by the Exchange, i.e., by an Exchange's Transaction Processor (TP), also referred to as a match engine or matching engine, to execute a trade, with the results thereof being communicated to the market participants through electronic notifications/broadcasts, referred to as market data feeds. Outstanding (unmatched, wholly unsatisfied/unfilled, or partially satisfied/filled) orders are maintained in one or more data structures or databases referred to as "order books," such orders being referred to as "resting," and made visible, i.e., their availability for trading is advertised, to the market participants through the electronic notifications/broadcasts, i.e., market data feeds, as well. An order book is typically maintained for each product, e.g., instrument, traded on the electronic trading system and generally defines or otherwise represents the state of the electronic trading system and of the market for that product, i.e., the current prices at which the market participants are willing buy or sell that product. As such, as used herein, an order book for a product may also be referred to as a market for that product.

A market data feed, referred to as market data or market feed, is a compressed or uncompressed real time (with respect to market events), or substantial approximation thereof, an electronic data/message stream provided via an electronic communications network, such as the Internet, by the Exchange directly, or via a third party intermediary. A market data feed may be comprised of individual electronic messages, each comprising one or more packets or datagrams, and may carry, for example, pricing or other information regarding orders placed, traded instruments and other market information, such as summary values and statistical values, or combinations thereof, and may be transmitted, e.g., multi-casted, to the market participants using standardized protocols, such as UDP over Ethernet. More than one market data feed, each, for example, carrying different information, may be provided. The standard protocol that is typically utilized for the transmission of market data feeds is the Financial Information Exchange (FIX) protocol Adapted for Streaming (FAST), aka FIX/FAST, which is used by multiple exchanges to distribute their market data. Pricing information conveyed by the market data feed may include the prices, or changes thereto, of resting orders, prices at which particular orders were recently traded, or other information representative of the state of the market or changes therein. Separate, directed/private, messages may also be transmitted directly to market participants to confirm receipt of orders, cancellation of orders and otherwise provide acknowledgment or notification of matching and other events relevant, or otherwise privy, only to the particular market participant.

The GLOBEX® electronic trading system, offered by CME implements an electronic trading system/marketplace for trading futures and options (option contracts), referred to as Exchange Traded Derivative (ETD) options, on futures wherein the underlying is a futures contract for a particular underlier. They are listed and traded by Strike price and Expiry (daily, weekly, monthly, quarterly). ETD options physically expire into, i.e., upon expiration the contract delivers, the closest expiring future contract (typically a highly liquid, if not the most liquid, future contract) for the particular underlier, e.g., in the case of an ETD FX option, it is the closest quarterly expiring future contract. Then, the futures contract is settled physically or via cash.

In particular, GLOBEX® is an open access marketplace that allows participants to directly enter their own trades and participate in the trading process, including viewing the book of orders and real-time price data. GLOBEX® has a number of core components/applications/engines or components including a transaction receiver processor (TR), e.g., a market segment gateway, a transaction processor (TP), e.g., a matching engine, a result generator (RG), e.g., a market data generator, and a transaction logger (TL) which includes a database that stores records for transactions for reporting, audit and historical purposes, each of which, in prior implementations, may be deployed in a distributed fashion, e.g., on different inter-networked physical servers. As will be described, in the disclosed embodiments, these components may be integrated, e.g., into a single system/server or tightly coupled set thereof.

The following sequence describes how, at least in part, information may be propagated in an electronic trading system such as GLOBEX®, through a series of electronic messages, and how orders may be processed:

(1) An opportunity is created at the TP, such as by placing a recently received but unmatched order on the order book to rest indicating a trader willing to trade a particular quantity at a particular price, i.e., an opportunity for another trader to trade therewith;

(2) The TP creates an update reflecting the opportunity and sends it to the RG via the network;

(3) The RG generates market data message based on the update and transmits it, e.g., using multicasting, or multiple unicast streams, or other mode of broadcasting via the network, the generated market data message to all of the market participants to advertise the opportunity to trade, i.e., transmits a broadcast market data feed message;

(4) The market participants evaluate the opportunity and each, upon completion of their evaluation, may or may not choose to respond with an order, i.e., a message containing their counter-order, responsive to the resting order, i.e., counter to the resting order for some or all of the available quantity, by transmitting the counter-order via the network to the TR;

(5) The TR receives any counter orders generated by the market participants, ascribes an ordering to each received order relative to the other received orders, sends confirmation of receipt back directly to each submitting market participant, and forwards the received orders to the TP via the network;

(6) The TP evaluates the received orders and matches, using for example, a price/time priority algorithm, the first suitable arriving order, based on the ascribed ordering, against the resting opportunity and a trade is executed. Depending upon the available quantity of the resting order and the quantity of the incoming order, one of the resting order or the incoming order may be fully satisfied with any remainder of either order being placed on the order book to rest, or cancelled, etc.

(7) The TP creates an update and sends it to the RG via the network.

(8) The RG generates a market data message based on the update and transmits the generated market data message to all of the market participants via the network.

At various points in the above process, data regarding the processing of incoming orders and the final and/or intermediate results thereof may be stored by the TL.

As will be appreciated, since different components may be implemented in one or more separate servers interconnected via a network connection, the latency of the messages communicated therebetween may impact the performance of the system.

As described above, Fault Tolerance is generally regarded as the ability to mask, or recover from, erroneous conditions in a system once an error has been detected. Fault tolerance is typically required for mission critical systems/applications. Mission critical typically refers to any indispensable operation that cannot tolerate intervention, compromise, or shutdown during the performance of its critical function, e.g., any computer process that cannot fail during normal business hours. Examples of mission critical environments include business-essential process control, finance, such as the electronic trading systems described above, health, safety, and security. These environments typically monitor, store, support and communicate data that cannot be lost or corrupted without compromising their core function.

In addition to increased capacity and lower latency, as already indicated above, the global nature of electronic trading systems has further driven a need for fault tolerance to increase their availability and reliability. Consistent reliable operation may be critical to ensuring market stability, reliability, and acceptance. Therefore, scheduled outages should be minimized and unscheduled outages should be eliminated.

In particular, as described above, critical applications/systems such as electronic trading systems often feature failure/disaster recovery mechanisms which allows the state of a primary instance of the application/system, e.g., the state of the database thereof, to be recovered, restored, replicated and/or restarted, etc. in the event of an otherwise uncorrectable or unrecoverable temporary or permanent failure of one or more components of the primary instance of the application/system or the entirety thereof, or one or more components of the infrastructure upon which the primary instance is implemented. The state of the system often refers to the state of the most recent committed transaction prior to the failure.

As noted above, these failure recovery mechanisms may take the form of a backup component for each component of the primary system. One type of backup may provide a fully redundant copy/instance of the primary component, including the primary component's database, which receives copies of all inputs to the primary instance and processes those inputs upon receipt and stores the results just as the primary system would but, for example, reserving its outputs rather than sending them on to the consumers of those outputs, etc., e.g., to avoid delivering duplicates the outputs of the primary instance during normal operations. While potentially more expensive, with this type of backup system, when the primary component fails, the backup component can simply be switched over to be used in its place, with some caveats. This may provide for a faster and/or more reliable recovery after a failure occurs. Another type of backup may simply comprise a database or other storage which stores copies of the inputs to the primary instance along with the outputs generated thereby or otherwise a log of which inputs were successfully processed by the primary instance, such that when the primary instance fails and a backup instance is started, the backup store need only be consulted to determine which inputs need to be re-processed by the backup instance before it can assume normal processing.

As described above, when implementing a backup system, the operator needs to consider where to locate, physically and/or logically, that backup system relative to the primary instance and the source of inputs thereto. For example, in the case of physical infrastructure issues or natural disasters which may affect the geographic location of the primary instance, one would not want the backup system to be physically located in the same geographic areas as then it may be vulnerable to the same issues, thereby reducing the effectiveness of the backup system. Accordingly, most operators locate their backup systems in different geographic regions from where the primary instance is located to minimize the chance that both systems will experience failures due to the same cause. It will be appreciated that many operators deploy multiple backup systems located in disparate geographic regions to further minimize the likelihood of the same event compromising both the primary instance and the availability of at least one backup system.

However, as already stated above, locating the backup system in a geographic location different from where the primary instance is located creates a latency issue with regard to communication of the transactional inputs to both systems to assure that the backup system is synchronized with the primary system should the backup system need to take over, i.e., to minimize transaction reprocessing or loss. One solution may be to receive the transactional inputs from their source at a location that is equidistant, or otherwise subject to substantially equal/symmetric communications latencies, to both the primary instance and the backup system, where the transactions are then relayed to both system from this equidistant location. However, for storage-based backup systems, checkpoints from the primary instance may still need to be periodically communicated between the primary instance and the backup system to minimize the extent to which inputs need to be reprocessed when a failure occurs. Furthermore, in latency sensitive applications, such as financial transaction processing, it may be necessary to locate the primary instance close to the source of transactions sent thereto so as to minimize the operational latency of the application/system. This may necessarily mean the backup system has to be located further from that source of transactions.

As used herein, primary instances of a system and the backup instances/systems, or components thereof, may be geographically/physically and/or logically separated from one another introducing communications latency therebetween, i.e., they may be separated geographically/physically, e.g., located in different physical locations or geographic regions, and/or logically separated, e.g., by one or more interconnecting communications media or other intervening components, such as relays, gateways or switching devices. For example, a communications path of a certain length comprising numerous intervening gateways or switching devices may be characterized by more latency than a longer communications path having fewer such intervening components. More particularly, the distance/length/latency of a given data/communications path interconnecting any two of the described components or other intervening components, whether those components are themselves physically close or not, may introduce latency in the electronic communications therebetween. Further, any asymmetries in the distance/length/latency between the interconnecting data/communications paths, or the number or type of intervening components, whether or not they interconnect the same source and destination end points, may introduce similar asymmetries in the latencies of the electronic communications communicated therethrough.

Further, differences in communications latency of a given communications/network path, or as between two different network paths to a common destination, may be caused by static differences, dynamic differences, or a combination thereof, in the network infrastructure which makes up those network paths, e.g., network switches, wires, wireless connections, etc. Static differences include: media type/characteristics such as cat6 copper cable, fiber optic, satellite, microwave or Wi-Fi; cable length/impedance where a longer and/or higher impedance cable requires a longer time to transit than a shorter and/or lower impedance cable of the same type; number, type and capability of routing and switching devices along the path which impart processing delay to perform their functions; transceivers which transfer/translate messages between different media such as between copper, fiber and wireless media, etc. Generally, static differences are differences which do not change over time, e.g., delays attributable to static characteristics of the network infrastructure. Dynamic differences may include: network load where increased network traffic/congestion may increase latency; interference such as radio frequency interference, sunspots, etc. which may cause errors and retries in the transmission; equipment/media degradation or mechanical issues such as temperature/environmental sensitivity, poor connections or degraded components which may impart transmission errors or intermittent or varying changes in impedance, capacitive and/or resistive delay, etc. Generally, dynamic latency differences vary over time and may or may not be predictable. Given dynamic latency variations, a network path that has a higher latency as compared to another network path at a particular time may have a lower latency at another time. Dynamic latencies may affect different messages along the same path where, not only may one message transit the network path faster than another message, but one message may overtake another message in transit such as where an earlier forwarded message must be resent by intermediate network component due to an intermittent error and where the earlier message is resent after a later forwarded message is communicated by that intermediate network component. It will be appreciated that static latency differences may be addressed by measuring the latency variances among the different network paths and physically or logically statically compensating for those difference such as by adding an additional length of cable or an electronic fixed delay buffer along a lower latency path to equalize that path to a longer latency path. Alternatively, slower network infrastructure components may be replaced with faster components to decrease latency commensurate with another network path. While some dynamic latency issues may be mitigated using static changes, such as replacing interference-susceptible components with shielded components, implementing proper maintenance and upkeep, etc., it will be appreciated that given the nature of dynamic latencies, such latencies cannot be completely addressed in this manner.

Communications latency differentials/disparities/asymmetries may result in transaction inputs being received at the backup system later than they were received at the primary instance resulting in the backup system operating "behind" the primary instance. That is, at any moment in time where the primary instance is processing a series of transactions, T, T+1, T+2 . . . T+50, etc., where the primary has processed up to T+38, the backup may still be processing transaction T+2. Furthermore, at any given moment, transaction inputs, e.g., T3-37, may be en route, or otherwise "in flight" or "on the wire" to the backup system and vulnerable to data loss should a failure compromise the mode of communication.

Accordingly, backup systems may be intentionally implemented so as to process transactions "behind" the primary instance, e.g., only processing a given transaction once it is known that the primary instance has already successfully processed that transaction. In a failover situation, the backup instance need only catch up by processing the most recent transaction received and/or attempted by the primary instance and then the backup instance may proceed to take over to replace the failed primary instance to process newly received transactions.

In one implementation, where the components of the electronic trading system are separately deployed and interconnected with a network, a component level backup system may be deployed such as the system using a backup/active copy-cat instance to achieve fault tolerance, see U.S. Pat. No. 7,434,096 ('096), filed on Aug. 11, 2006, entitled "MATCH SERVER FOR A FINANCIAL EXCHANGE HAVING FAULT TOLERANT OPERATION" and U.S. Pat. No. 7,480,827 ('827), filed on Aug. 11, 2006, entitled "FAULT TOLERANCE AND FAILOVER USING ACTIVE COPY-CAT", assigned to the assignee of the present application, the entirety of all of which are incorporated by reference herein and relied upon.

Both '096 and '827, relate to a fault tolerant failover mechanism allowing the backup instance of a specific component, e.g., the match engine, to take over for the primary instance of that component in a fault situation wherein the primary and backup instances are loosely coupled, i.e., they need not be aware of each other or that they are operating in a fault tolerant environment. As such, the primary instance need not be specifically designed or programmed to interact with the fault tolerant mechanisms. Instead, the primary instance needs only be designed to adhere to specific basic operating guidelines and shut itself down when it cannot do so. By externally controlling the ability of the primary instance to successfully adhere to its operating guidelines, the fault tolerant mechanisms of both '096 and '827 can recognize error conditions and easily failover from the primary instance to the backup instance. In these applications, in contrast with the disclosed embodiments, a primary instance refers to a single process, thread, or application/component. Therefore, the fault tolerance mechanism only replaces the single application that failed and not the whole system. Further, in these systems, an external mechanism is implemented to force an application into failure, by, for example, preventing a database commit, to deploy the fault tolerant functionality without having to specifically modify the application to incorporate it therein.

As operators seek to enhance the performance of the electronic trading system, one area of focus is on the network connections which are used to interconnect the various components of the system and which may introduce substantial performance degradation, in the form of latency, to the operation of the system. To mitigate such performance issues, the system components may instead be integrated and operated on a single processing platform, i.e., a single- or multi-processor server or tightly coupled/interconnected set of servers, enabling elimination of the higher latency network interconnects and associated latencies introduced thereby in favor of much faster interconnects such as direct processing interconnects, inter-process communication and/or shared memory messaging.

However, the integration of the components into a single processing environment further complicates the provision of fault tolerant operation as the use of component level backup instances would again require, in a failover situation, that the correctly operating components communicate with the backup instance of the failed component over a necessarily higher-latency network/interconnect, necessarily impacting performance. Furthermore, in an integrated implementation any fault which might impact one component is likely to impact all components.

As will be described further below, the disclosed embodiments are implemented in conjunction with an integrated system/architecture that implements the core applications/components/engines of the above described electronic trading system, e.g., the TR, the TP, the RG, and TL, on, for example, a single server computer having at least one processor and memory to allow a technical benefit of using shared memory communication between the core components. The shared memory communication relates to an inter-process communication (IPC) that enables exchanging data between applications/components running at the same time.

Even though the integration of the electronic trading system components enables implementation of all core components on a single server or tightly coupled/interconnected group thereof, this implementation causes unique challenges in how to handle fault tolerance (e.g., starting up and transitioning to a backup) and coordinating state synchronization across core components.

In particular, in one implementation of the disclosed embodiments, in contrast with other systems for implementing fault tolerance, provide fault tolerance to integrated systems which move/integrate core components/applications from separate servers interconnected via a network, each with a separate backup, to a single server/processing environment while making sure all components/applications are backed up and synchronized.

The disclosed embodiments provide a hard backup, i.e., a similar/replicated system implemented on a different server or tightly coupled/integrated set thereof, e.g., located remote from the primary system, to maintain resiliency when the core components/applications are integrated on the same server. Therefore, in contrast with previous fault tolerance systems that replace only failed components, if there are any issues on any of the core components on the primary server, then all of the core components on the primary server fail over to the backup server.

Figure 3:
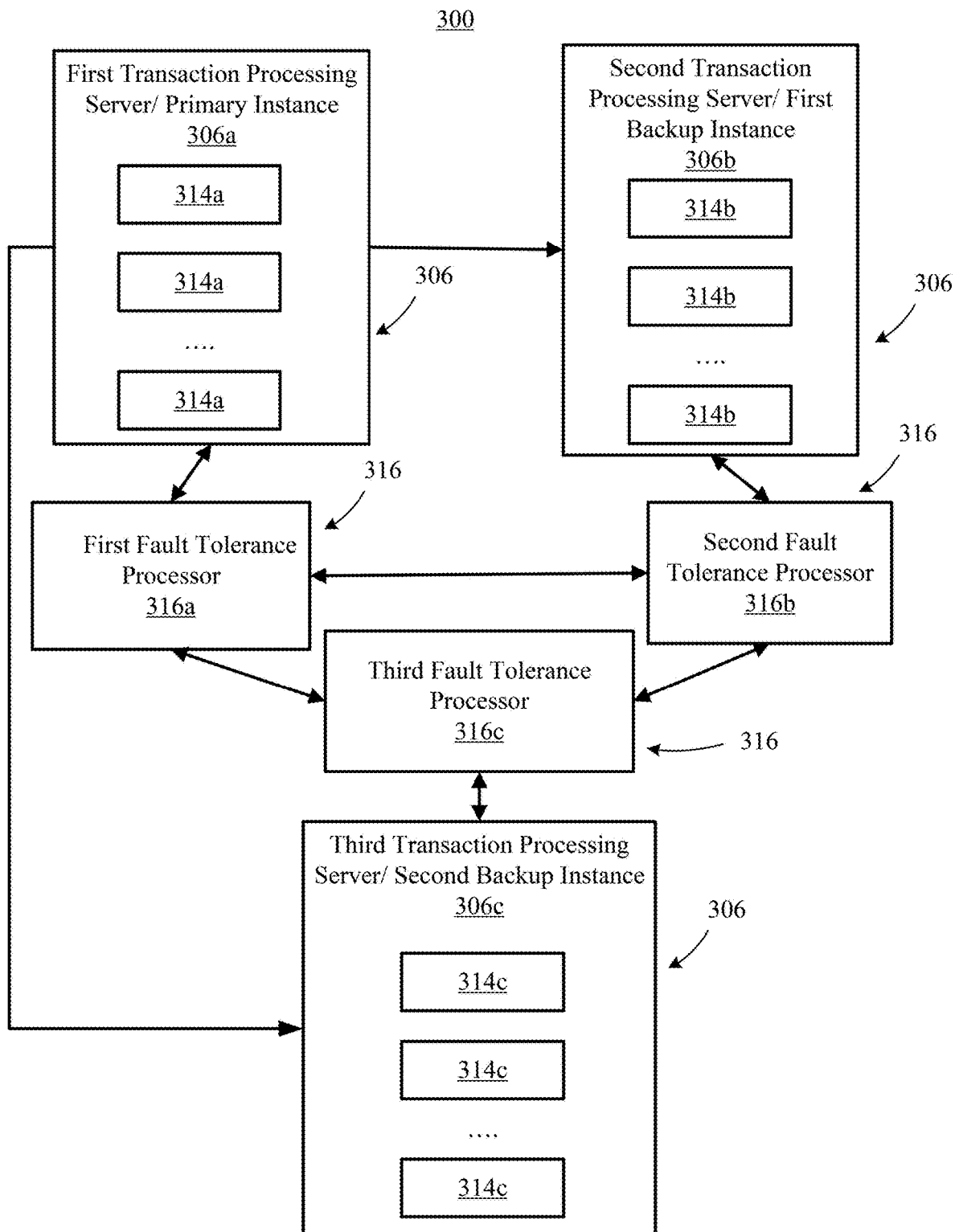
FIG. 3 depicts a block diagram of a component integrated and fault tolerant system according to one embodiment.

In one implementation, as shown in FIG. 3, the disclosed embodiments enable the provision of at least two or more identical instances of an electronic trading system, e.g., transaction processing servers, where one of those instances serves as the primary instance of the trading system responsible for processing incoming requests for a transaction and the other instances serve as a backup therefore. In particular, each instance is identical to each other but is configured to operate differently depending on its "role", i.e., whether the instance serves as a primary instance or as a backup. Each instance may include software applications/components/threads executing on one or more processors/processing cores and/or other hardware components, consisting of, or executing on a processing element, server, or the like. Each component is characterized by a current state. Each instance is configured to receive a message via an electronic communications network, process the message to produce a result, and generate a result message including the result which may alter the current state of the instance. While described separately in terms of components and their particular functions/operations, it will be appreciated that the disclosed components of each instance of the disclosed transaction processing server may be implemented as one or more separate applications, computer programs and/or processing threads, which may be independently or dependently executed/implemented, such as substantially in parallel, in an integrated processing environment, such as by one or more physical and/or virtual processors or processing cores of one or more server computers, e.g., tightly coupled/interconnected via low latency interconnects. and all such implementations are contemplated herein. For example, the TR component may be implemented in a networking component of a server or a network switch coupled therewith, i.e., as part of the network interface (the "NIC") to the communications network, so as to receive and process incoming transaction messages from the network as soon as possible. Each component is configured to perform one or more operations including the receipt of the message, processing of the message, and generation of result messages. Each component is further configured to communicate with its counterpart in the other instances via a network/inter-instance network or bus and track the counterpart's current state and what message is being processed on what component via, for example, status messages. To implement the disclosed fault tolerant functionality, each instance is also configured to join a corresponding Fault Tolerance (FT) group. In one embodiment, the Fault Tolerance group may be managed/executed/implemented by a processor, e.g., a fault tolerance processor (FT or FT processor). Instead of creating an instance for each component, each of the components may be configured to initialize and start up in the corresponding single server/processing environment and register/subscribe to a corresponding Fault Tolerance group/FT.

In one implementation, one or more of the plurality of instances may be implemented separate from each other in independent environments but in the same physical hardware. In another implementation, one or more of the plurality of instances may be implemented separate from each other and may be configured to be implemented in a plurality of separate physical hardware. Each separate physical hardware may be disposed in different locations, e.g., different positions in the same rack in the same data center, different racks in the same data center, or in separate geographical locations. No matter where they are located, relative to each other, each of the plurality of instances operate in similar manner as described herein.

In one embodiment, each component of a given instance is configured to communicate with another component of that same instance via a shared memory architecture or other inter-process communication or low latency interconnect mechanism.

Each component is configured to start up, initialize communications, and communicate with the corresponding FT via status messages. Each FT is further configured to coordinate and synchronize the state of the components that are running in the same corresponding instance. Once the FT has determined that all corresponding components have started, i.e., once all of the components have joined and registered with a corresponding FT group, i.e., once the FT group has been created, the FT communicates with the other FTs to, for example, vote amongst each other and/or determine or otherwise designate one of the instances to operate in the role of the primary instance and the others to operate in the role of a backup instance. Each FT notifies all components on the corresponding instance whether they are part of a primary or a backup instance. In other words, each component on each corresponding instance knows whether the component belongs to a primary or a backup instance. In one embodiment, each of the FTs determines the primary instance by determining which one of the instances is the first to report that all of the components have been registered with the corresponding FT.

Figure 5:
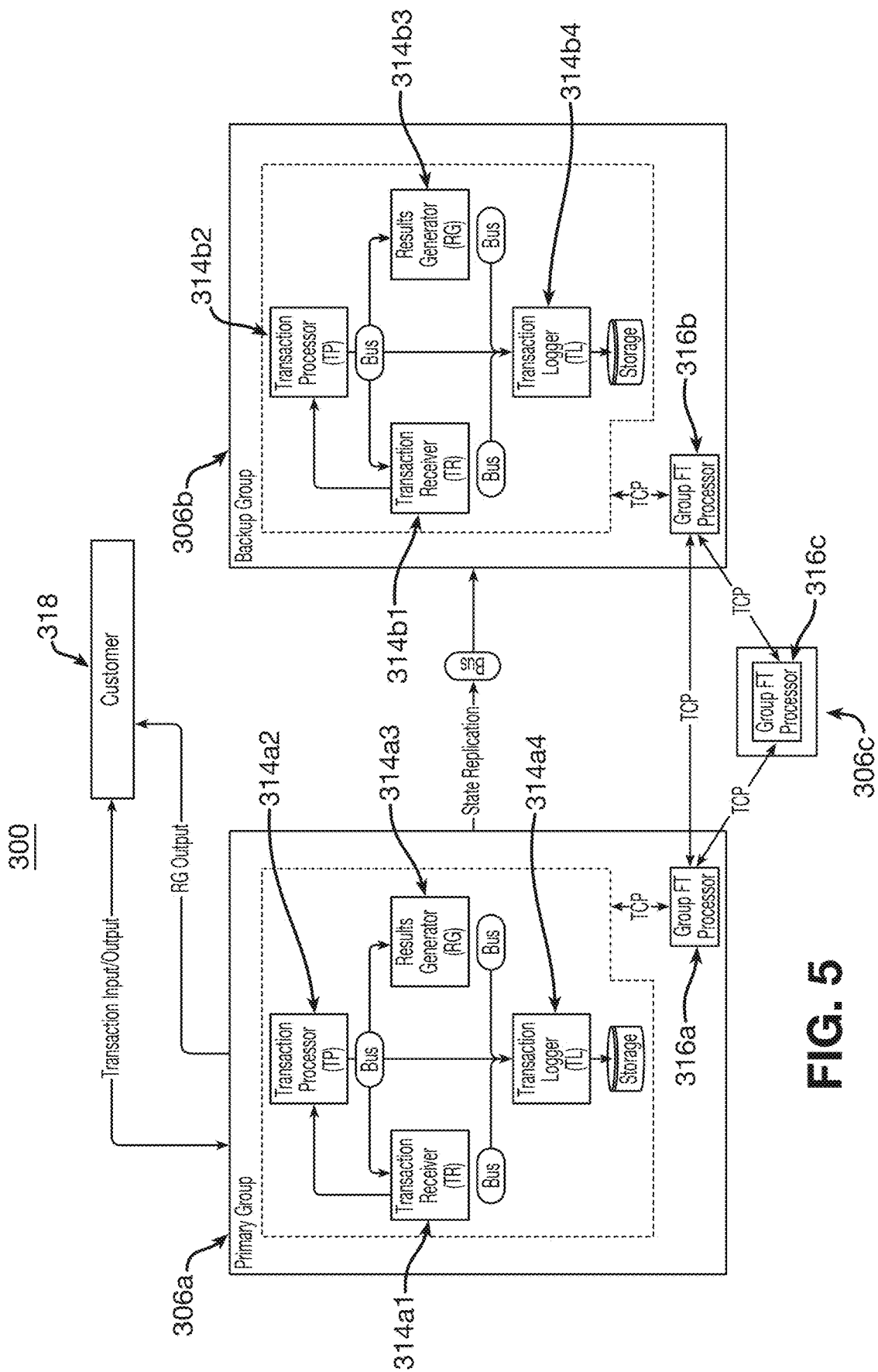
FIG. 5 depicts a block diagram of a component integrated system and fault tolerant system according to one embodiment.

As already indicated, the core components/applications may be grouped in a collection (or Fault Tolerance Group). In one embodiment, each collection is implemented in the same server/instance. The whole group of core components is replicated in the backup groups/instance(s)/server(s). Each Fault Tolerance group may have N number of applications, for example FIG. 3 shows 3, but it could be 4 (as shown in FIG. 5) or any other amount. When the core components/applications are started, all of the components within the same group or instance, need to have the same role, either a primary role or a backup role. As mentioned above, the FT is configured to get the role assigned to each corresponding group/instance/server.

In implementations where the functions of one or more of the disclosed components are implemented as an integrated or otherwise common component/thread/application, those integrated components may collectively register with the FT as described.

In one implementation, each collection of core components are separate from each other and are configured to run on separate physical hardware.

In one implementation, one or more of the core components may be implemented by one or more processors. In another implementation, one or more of the plurality of components may be implemented separate from each other in independent environments but in the same physical hardware. In another implementation, one or more of the plurality of components may be implemented separate from each other in different physical hardware. In one implementation, an FPGA based implementation may be used that permits the components of each instance to be collocated, such as via a custom interface, or otherwise closely interconnected with networking equipment, such as a router or switch, e.g. via a backplane thereof. This would allow each component to communicate as quickly as possible and avoid the latency introduced, not only by having to route the messages over conventional networking media, but also by the communications protocols, e.g. Transport Control Protocol ("TCP"), used to perform that routing.

While the disclosed embodiments will be discussed with respect to a single backup instance of the electronic trading system, it will be appreciated that more than one backup instance may be implemented to provide further redundancy. In one implementation, the disclosed embodiments implement multiple backup instances, which may be geographically dispersed, wherein the primary instance interacts with each of the backup instances in an identical manner as will be described.

The disclosed embodiments may provide order message information to external recipients via two separate modes of network communications: a direct/private path used by a customer entering an order and receiving a confirmation of receipt and/or fill thereof, e.g., a transaction message (TM) published to the customer, such as via iLink, an order routing and communication protocol provided by the Chicago Mercantile Exchange Inc., and a public path, e.g., the trade summary message published to all market participants, e.g., via multicast. The TM interface facilitates the entry, modification, and cancellation of orders, as well as receipt of order confirmation and fill information.

In one implementation, one of the differences between the operation of an instance as a primary or as a backup is communication with external recipients, e.g., the customer and all market participants. In particular, only the primary instance transmits the results to external recipients via the private and public path. Results produced by the backup instance are not transmitted to external recipients, .e.g., the results are withheld by the backup instance or otherwise prevented from being transmitted to or otherwise reaching the external recipients.

In one implementation, as the primary instance processes incoming transactions, the primary instance transmits the current state of each of its components to the backup instance, i.e., to the corresponding components thereof. As will be described, because the primary instance first receives and initiates processing of incoming transactions, the state of each of the components of the backup instance will be "behind" the corresponding primary instance component, i.e., the state of each of the components of the backup instance will necessarily correspond to the state of each of the components of the primary instance subsequent to the processing of a message preceding the message currently being processed by the primary instance. Specifically, as discussed further below, the backup instance, as a byproduct of its dependency on the primary instance, will necessarily process incoming order requests/messages "behind" the primary instance, e.g., each component thereof only performing its processing task of a given incoming order message once it is known that the corresponding component of the primary instance has already successfully processed that message. In a failover situation, as will be described, the backup instance, i.e., each component thereof, needs only catch up by processing the most recent transaction attempted by the primary instance and then the backup instance may proceed to take over to replace the failed primary instance.

In particular, each of the components of the primary instance is configured to execute an operation in the furtherance of processing an incoming order message and to communicate a result message, e.g., an electronic result message, that includes the result of the operation to the corresponding component of each backup instance. Subsequent to the receipt of the result message, each corresponding component of the backup instance processes the given message and compares a result of the operation thereof with the result indicated by the received result message to determine whether one of the components of the primary instance or the corresponding component of the backup instance is operating correctly. In other words, each component of the backup instance does not start processing a given message until it has received the corresponding result message from the primary instance.

The disclosed embodiments further relate to a fault tolerance system/process which provides redundancy and error/failure recovery to an integrated electronic trading system as described. Specifically, when the disclosed fault tolerance system determines that a failure has occurred on the primary instance, the fault tolerance system designates one of the backup instances as a new primary instance. The backup instance designated to become the new primary instance is notified that it needs to become the primary instance and, depending on the type of failure, the primary instance may continue to queue messages until all components in the designated backup instance have caught up processing queued messages. Therefore, all messages are processed in the correct sequence and all messages are processed before failing over to the designated backup instance. Depending on the type of failure, when the FT coupled with the primary instance determines that the failure has occurred in the primary instance, each of the FTs is configured to cause the primary instance to at least de-couple from the instances and/or from the electronic communications network.

In particular, each of the FTs is configured to determine whether a fault occurred in the primary instance. When a FT determines that a failure occurred in the primary instance, the FT is configured to notify the other FTs that a failure of the primary instance has occurred. The FTs then vote to designate one of the backup instances as a new primary instance. In particular, the FTs cause one of the backup instances to be designated as a new primary instance. The backup instance designated as the new primary instance is configured to synchronize the current state of each of the plurality of components thereof based on received electronic messages indicative of a result of the operation of the corresponding component of the primary instance, and process any incoming requests not processed by the primary instance before commencing processing of new incoming requests.

In one implementation, each of components of each instance is coupled with the corresponding FT such that the corresponding FT is able to detect a failure of any of the components of the instance. A failure on any of the components of the primary instance is deemed to indicate a failure of the primary instance.

In one implementation, each FT periodically receives a communication, e.g., a heartbeat message, from the others FTs. A failure to receive the communication from one of the FTs is deemed to indicate a failure of the instance coupled therewith. The failure to receive the communication is indicative that there may be a network failure.

As already noted, the disclosed embodiments provide an improved transaction processing system that enables fault tolerant operation of integrated electronic trading systems which eliminate the network interconnects and associated latencies between components introduced thereby in favor of much faster interconnects such as inter-process communication and shared memory messaging.

The disclosed embodiments further provide an improved system resiliency and disaster recovery mechanism for a deterministic transaction processing system which can adaptively accommodate processing and communications latencies, for example, in a cloud/shared resource deployment, to mitigate data loss and performance impact while minimizing failure recovery costs.

The provision of a fault tolerance system for a transaction processing system which minimize, if not eliminate, both the amount of data, i.e., the number of transactions, which can be lost during a failure and the performance impact on the system is a technical implementation and problems therewith, such as data loss, processing and communications latency variation, processing performance degradation, are technical problems which can affect computer processes and systems which rely on electronic message based communication for operation. As such, the disclosed embodiments provide technical solutions to these technical problems.

The disclosed embodiments solve problems which uniquely arise in the fields of computer technology and electronic communication. The disclosed embodiments are rooted in computer technology in order to overcome problems specifically arising in computer systems and interprocess communications. Indeed, the subject technology improves the functioning of the computer by, for example, minimizing, if not eliminate, both the amount of data, i.e., the number of transactions, which can be lost during a failure, the performance impact on the system and the costs to recover in the event of failure.

Therefore, the disclosed embodiments provide a specific and practical application which improves upon prior messaging and electronic trading platforms and provides additional functionality not previously provided.

When a component, device, element, or the like of the present disclosure is described as having a purpose or performing an operation, function, or the like, the component, device, or element should be considered herein as being "configured to" or "operative to" meet that purpose or to perform that operation or function.

Computing Environment

The embodiments may be described in terms of a computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

A trading network environment for implementing trading systems and methods is shown in FIG. 1. FIG. 1 shows a block diagram of an electronic trading system/architecture 100 which may be implemented as an instance of the integrated electronic trading system operating on a server as described in more detail herein. The system 100 receives messages that include orders and transmits market data related to orders and trades to users, such as via a wide area network 162 and/or a local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
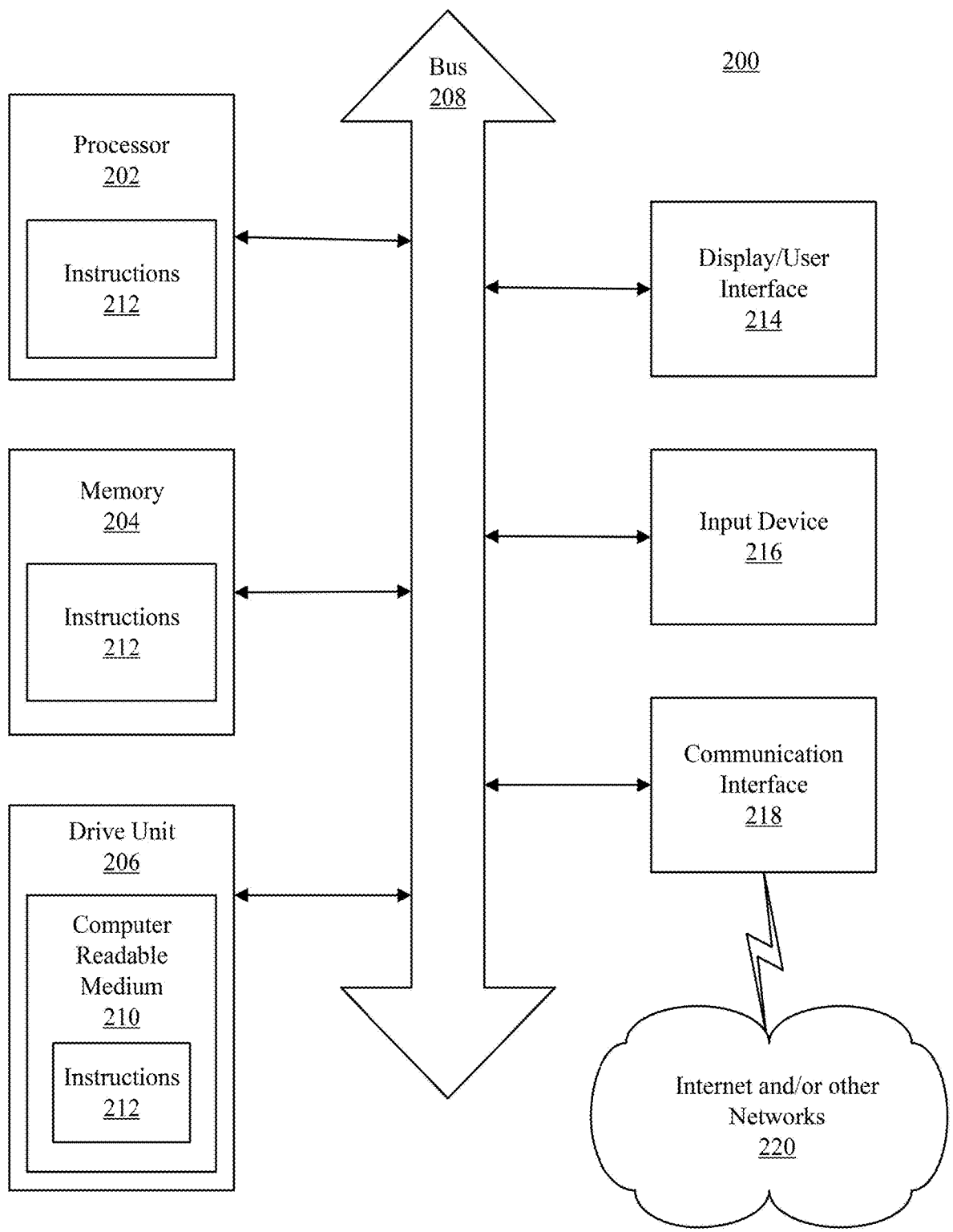
FIG. 2 depicts a general computer system, according to some embodiments.

The system 100 may be implemented with one or more mainframe, desktop, or other computers, such as the example computer 200 described herein with respect to FIG. 2. A user database 102 may be provided which includes information identifying traders and other users of the exchange computer system 100, such as account numbers or identifiers, usernames, and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage, or maintain one or more margining mechanisms implemented by the exchange computer system 100. Such administration, management or maintenance may include managing a number of database records reflective of margin accounts of the market participants.

A message management module 116 may be included to, among other things, receive, and extract orders from, electronic data transaction request messages. The message management module 116 may define a point of ingress into the system 100 where messages are ordered and considered to be received by the system 100. This may be considered a point of determinism in the system 100 that defines the earliest point where the system 100 can ascribe an order of receipt to arriving messages. The point of determinism may or may not be at or near the demarcation point between the system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the TR that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk, and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the system 100. For example, the settlement module 120 and the risk management module 114 may be integrated to any desired extent. In some cases, one or more margining procedures or other aspects of the margining mechanism(s) may be implemented by the settlement module 120.

A fault tolerance module 124, shown in more detail in FIGS. 12A(1), 12A(2), 12A(3), and 12B described in more detail below, may be included to, using the disclosed embodiments, implement, facilitate, and manage both the reliable transmission of copies of messages/state of the components of the system 100 and, in the event of a failure, the recovery thereof, e.g., among other modules or components of the system 100, as described herein. This fault tolerance module 124 may be part of, or include, a messaging module, not shown, which implements inter-component message communication.

One or more of the above-described modules of the system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers, or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the system 100 or by which a user may communicate, e.g., send and receive, trade, clearing or other information therewith, such as by using messaging via the messaging module 122. It should be appreciated that the types of computer devices deployed by traders and the methods and media by which they communicate with the system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the system 100. Depending on the type of computer device, a user can interact with the computer with a keyboard, pointing device, microphone, pen device or other input device now available or later developed.

An exemplary computer device 150 is shown directly connected to system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computers and other devices which are coupled with the LAN 160. Computers and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the system 100 may include one or more market makers 166 which may maintain a market by providing constant bid and offer prices for a derivative or security to the system 100, such as via one of the exemplary computer devices depicted. The system 100 may also exchange information with other match or trade engines, such as trade engine 170. One skilled in the art will appreciate that numerous additional computers and systems may be coupled to the system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones, and other devices may also be connected to the system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode, and the like, operating alone or in combination. Likewise, processing strategies may include multiprocessing, multitasking, parallel processing, and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include shared or proprietary distributed processing, e.g., a cloud/shared host-based implementation, component/object distributed processing, and parallel processing. Alternatively, virtual computer system processing, e.g., using proprietary and/or cloud/shared host-based implementations, can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks," and a hierarchy of reconfigurable interconnects that allow the blocks to be "wired together," somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship with each other.

Component Integrated System

FIG. 3 depicts a block diagram of a system 300 for implementing an integrated component and fault tolerant system according to one embodiment.

The system 300 includes a plurality of transaction processing servers 306 coupled with each other via an electronic communications network such as the network 220 shown in FIG. 2. Each of the plurality of transaction processing servers 306 is operative to receive an incoming request for a transaction, process the received request to identify a previously received request for a transaction counter thereto in an attempt to satisfy one or both of the incoming request and previously received request and generate a result indicative thereof. One of the plurality of transaction processing servers 306 is designated as a primary instance 306a and each of the other transaction processing servers 306b and 306c is designated as a backup instance. Each of other transaction servers 306 designated as the backup instance 306b is configured to receive a copy of the incoming request from the transaction server designated 306a as the primary instance. The transaction processing server 306a designated as the primary instance at least commences processing of the incoming request prior to the transaction processing servers 306b and 306c designated as backup instances.

In one embodiment, only the transaction processing server 306a designated as the primary instance is configured to transmit a data message indicative of the generated result of the attempt to satisfy one or both of the incoming request and previously received request to a recipient external to the system.

In one embodiment, one or more of the plurality of transaction processing servers 306 is located in a geographic region different from a location of one or more others of the plurality of transaction processing servers 306.

Figure 4:
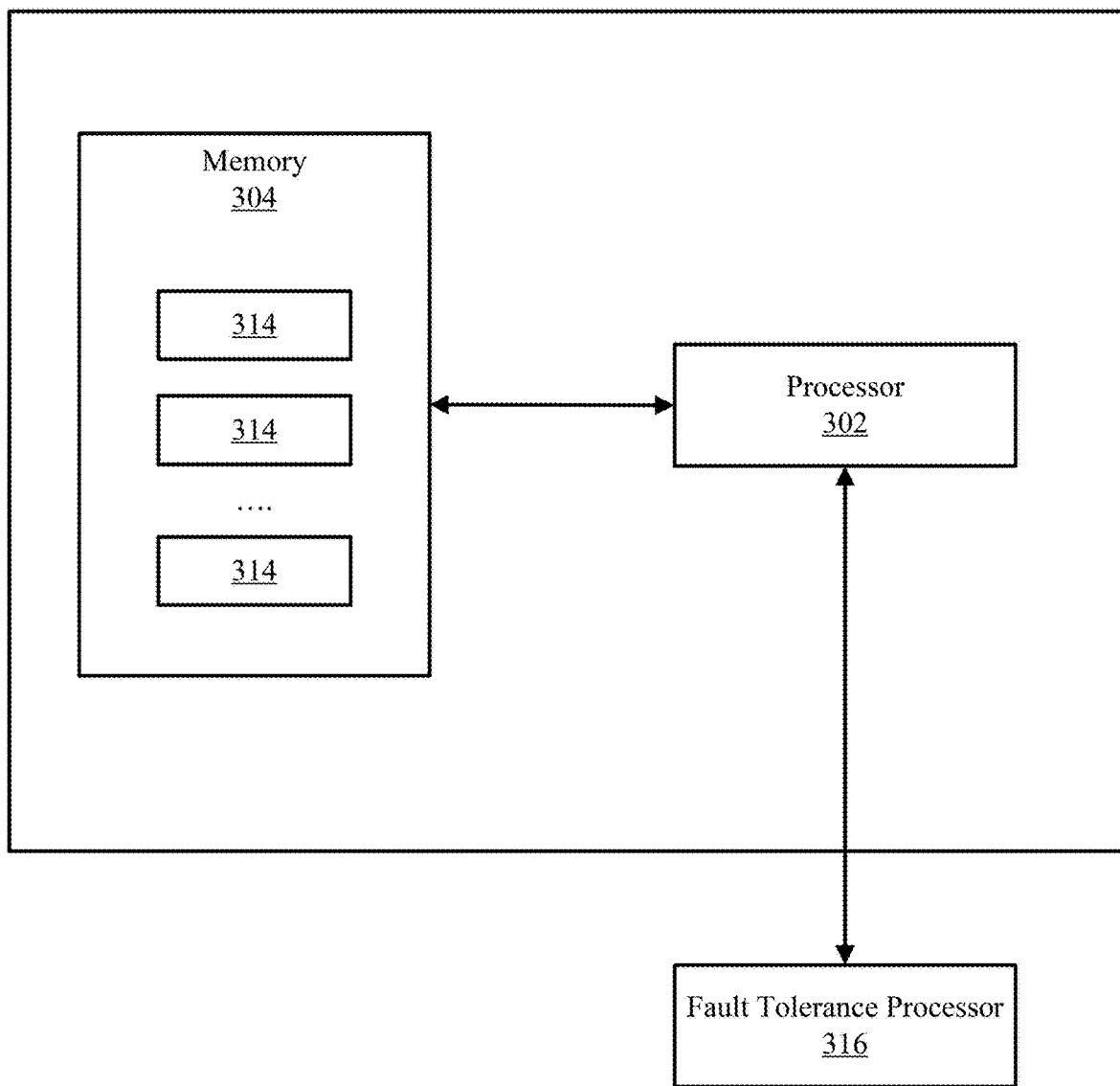
FIG. 4 depicts a transaction processing server according to one embodiment.

FIG. 4 depicts a detailed block diagram of a transaction processing server 306. Referring to FIGS. 3 and 4, each of the plurality of transaction processing servers 306 may include a plurality of components 314. Each component 314 may be implemented as a separate component or as one or more logic components, such as part of one more of the modules of the exchange computing system 100 described above, such as on an FPGA that may include a memory or reconfigurable component to store logic and a processing component to execute the stored logic, or as computer program logic, stored in a memory 304, or other non-transitory computer readable medium, and executable by a processor 302, such as the processor 202 and the memory 204 described above with respect to FIG. 2.

Each of the plurality of components 314 in each of the corresponding transaction processing server 306 is coupled with each other and is characterized by a current state. Each of the plurality of components 314 is configured to perform one or more of receiving an electronic message, processing the received electronic message and generating an electronic result message indicative of a result of an operation which may alter the current state thereof. In one embodiment, each of the plurality of components 314 are coupled with each other via a shared memory architecture, e.g., where messages may be exchanged via one component writing data indicative of the message to one or more common memory locations and the other component reading therefrom.

The system 300 further includes a plurality of fault tolerance processors 316 such as the processor 202 described above with respect to FIG. 2. As detailed above, the plurality of fault tolerance processors/processing components 316 are configured to execute/implement the FTs mentioned above. The system 300 further includes a fault tolerance memory (not shown) such as the memory 204 described above with respect to FIG. 2. Each of the plurality of fault tolerance processors 316 may be coupled with a fault tolerant memory (not shown) storing computer executable instructions executable by the fault tolerance processor 316 to perform the operations described below.

Each of the plurality of fault tolerance processors 316 is configured to determine which one of the plurality of transaction processing servers 306 to designate as a primary instance. In particular, the plurality of fault tolerance processors 316 establish, upon the plurality of transaction processing servers 306 starting up, which of the plurality of transaction processing servers 306 is designated as the primary instance. Each of the others transaction processing servers 306 are then designated as a backup instance. Only one of the plurality of transaction processor servers 306 may be designated as the primary instance at the same time. One or more of the plurality of transaction processing servers 316 may be designated as backup instances. In some embodiments, different roles may be assigned by the plurality of fault tolerance processors 316 including a primary role or a backup role. Only one of the plurality of transaction processing servers 306 may be assigned with the primary role at the same time. More than one of the plurality of transaction processing servers 306 can be assigned the backup role.

Each of the plurality of fault tolerance processors 316 is coupled with one transaction processing server of the plurality of transaction processing servers 306. Each of the plurality of fault tolerance processors 306 is configured to determine whether a failure has occurred in the transaction processing server 306 designated as the primary instance and, subsequent thereto, cause one of the others of the plurality of transaction processing servers 306 to be designated as a new primary instance.

In one embodiment, each of the plurality of tolerance processors 316a, 316b, and 316c is configured to notify the other plurality of fault tolerance processors 316a, 316b, and 316c if a failure in the transaction processing server designated as the primary instance 306a occurred.

In one embodiment, the failure in the primary instance 306a may include a component failure in any one of the plurality of components 314a of the primary instance 306a. Each of the plurality of components 314a is configured to notify the corresponding fault tolerance processor 316a that a component failure occurred.

In one embodiment, one or more of the plurality of components 314 of the transaction processing server 306 designated as the primary instance are each configured to communicate an electronic result message indicative of a result of an operation thereof to the corresponding component 314 of each of the other transaction processing servers 306 designated as the backup instance. Subsequent to the receipt of the electronic result message indicative of the result of the operation, the corresponding component 314 of each of the other transaction processing servers 306 designated as the backup instance compares a result of the operation thereof with the result indicated by the received message to determine whether one of the plurality of components 314 of the transaction processing server 306 designated as the primary instance or the corresponding component 314 of the other transaction processing servers 306 designated as the backup instance is operating correctly.

In one embodiment, each of the plurality of fault tolerant processors 316 periodically receives a communication from the others of the plurality of fault tolerant processors 316. A failure to receive the communication from one of the plurality of fault tolerant processors 316 is deemed to indicate a failure of the transaction processing server 306 coupled therewith.

In one embodiment, each of the plurality of components 314 of each of the plurality of transaction processing servers 306 are further coupled with the fault tolerant processor 316 coupled with that transaction processing server 306 such that the fault tolerant processor is able to detect a failure of any of the plurality of components coupled therewith.

In one embodiment, the state of each of the plurality of components of each of the other transaction processing servers designated as the backup instance corresponds to the state of each of the plurality of components of the transaction processing server designated as the primary instance subsequent to the processing of an incoming request preceding the incoming request currently being processed by the transaction processing server designated as the primary instance.

In one embodiment, each of the plurality of components 314 of each of the plurality of transaction processing servers 306 registers with a corresponding fault tolerance processor 316, i.e., a fault tolerance group. Each of the plurality of fault tolerance processors 316 determines which one of the plurality of transaction processing servers 306 to designate as the primary instance by determining which one of the plurality of transaction processing servers 306 is the first to communicate an electronic message indicative of the current state in which all of the plurality of components 314 have been registered with the corresponding fault tolerance processor 316.

In one embodiment, as shown in FIG. 3, the system 300 includes a plurality of transaction processing servers/instances including a first, second, and third transaction processing servers 306a, 306b, and 306c which are coupled with each other via the electronic communications network. The system 300 further includes a plurality of fault tolerance processors/groups including a first, second and third fault tolerance processor/FT 316a, 316b, and 316c which are coupled/connected with each other via the electronic communications network. In one embodiment, the connection between the plurality of transaction processing servers and fault tolerance processors may be a bus, communications network or other electronic communications/data transfer medium, and the like. As used herein, bus refers to any communications system which transfers data between software and/or hardware components within a computer or between computers, and the lie, and refers to all related hardware components, e.g., wire, optical fiber, and the like, and software, including communication protocols, and the like. The first, second, and third transaction processing server 306a, 306b, and 306b may be coupled with the first, second, and third fault tolerance processor 316a, 316b, and 306c respectively via the electronic communications network.

The first, second, and third transaction processing servers 306a, 306b, and 306c may each include a plurality of components 314a, 314b, and 314c respectively, which are configured to register with the corresponding first, second, and third fault tolerance processor 316a, 316b, and 316c which are configured to notify each other when the plurality of components 314a, 314b, and 314c have registered successfully.

Each of the plurality of components 314a, 314b, and 314c that are registered with, i.e., that belong to the same transaction processing server 306a, 306b, or 306c are coupled with each other via various interconnects. In one embodiment, each of the interconnects of the plurality of components 314a, 314b, and 314c may comprise a bus or other inter-process/inter-component communications/data transfer mechanism such as a shared memory, and the like. These interconnects may be implemented with message queues which provide buffering between the components, allowing the components to operate independently/asynchronously to one another, e.g., at different processing rates.

Each of the plurality of components 314a, 314b, and 314c is characterized by a current state and configured to perform one or more of receiving an electronic message, processing the received electronic message and generating an electronic result message indicative of a result of an operation which may alter the current state thereof.

As further described below, each of the first, second, and third fault tolerance processors 316a, 316b, and 316c periodically receives a communication from each other of the first, second and third fault tolerance processors 316a, 316b, and 316c. A failure to receive the communication by the first, second, or third fault tolerance processor 316a, 316b, and 316c from the others first, second, or third fault tolerance processors 316a, 316b, or 316c, is deemed to indicate a failure of the corresponding transaction processing server 306a, 306b, or 306c.

In one embodiment, each of the first, second, and third plurality of components 314a, 314b, and 314c are further coupled with the corresponding fault tolerant processor 316a, 316b, and 316c such that the fault tolerant processor is able to detect a failure of any of the plurality of components 314.

In one embodiment, the first, second, and third fault tolerance processors 316a, 316b, and 316c vote amongst each other to designate the first transaction processing server 306a as the primary instance 306a since it is the first one to report that the plurality of components 314a have registered. The second and third transaction processing servers 306b and 306c are designated as backup instances 306b and 306c.

In one embodiment, the primary instance 306a is the only instance that receives an incoming request from a recipient external thereto, e.g., a market participant or a customer, and that transmits the generated electronic message indicative of the produced result to the recipient external thereto. The backup instances 306b and 306c are configured to receive state messages, e.g., state replication messages, from the primary instance 306a, such as messages comprising the incoming requests received thereby. In particular, each of the plurality of components 314a of the primary instance 306a is configured to transmit result messages indicative of a result of an operation thereof to the corresponding components 314b and 314c of the backup instances 306b and 306c. Subsequent to the receipt of the result message, the corresponding components 314b and 314c of each of the backup instances 306b and 306c compares a result of the operation thereof with the result indicated by the result message to determine whether one of the plurality of components 314a of the primary instance 306a or one of the corresponding components 314b and 314c of the backup instances 306b and 306c is operating correctly. In particular, the component 314a of the primary instance 306a is configured to process an electronic message and to generate a primary result output. Each component 314b and 314c of each of the backup instances 306b and 306c is configured to receive the electronic message from the component 314a of the primary instance 306a, process the electronic message, and generate a backup result output. Each component 314b and 314c receives the output result message from its primary component counterpart 314a and reconciles the backup result output with the primary result output of the primary component counterpart 314a to determine correct operation.

In one embodiment, the state of each of the plurality of components 314b and 314c of each of the backup instances 306b and 306c corresponds to the state of each of the plurality of components 314a of the primary instance 306a subsequent to the processing of an incoming request preceding the incoming request currently being processed by the primary instance 306a.

FIG. 5 depicts a detailed block diagram of the integrated component and fault tolerant system 300 according to one embodiment.

In one embodiment, the system 300 may include a first, second, and third fault tolerance processors/FT 316a, 316b, 316c coupled with the respective first, second, and third instances 306a, 306b, and 306c.

In one embodiment, the system 300 may include a plurality of instances/servers/groups 306a, 306b, and 306c which are separate from each other. In one embodiment, each instance/server operates in its own physical hardware. In one embodiment, the first, second, and third fault tolerance processors 316a, 316b, and 316c designate the first transaction processing server 306a as a primary instance/server/group 306a, the second transaction processing server 306b as a backup instance/server/group 306b, and the third transaction processing server 306c as a second backup instance/server/group 306c.

Each of the primary instance 306 and the backup instance 306b may include a plurality of core components 314a and 314b respectively such as the plurality of core components 314a and 314b shown in FIG. 3. The second backup instance 306c may also include a plurality of components 314c (not shown in FIG. 5).

As mentioned above, even though the embodiments discussed below with respect to FIGS. 5-20, may only refer to a single backup instance, it will be appreciated that more than one backup instance may be implemented such as the second backup instance 306c which includes the plurality of components 314c (not shown in FIG. 5).

Synchronization of Primary Instance and Backup Instance

In one embodiment, as shown in FIG. 5, a customer 318 may submit and transmit a transaction message, such as a trade request, via a request message flowing into the primary instance 306a via the electronic communications network using, for example, the TM interface.

The primary instance 306a is configured to receive the request message, queue the request message, and route the request message to the transaction processor component 314b2 of the backup instance 306b for backup processing and matching. The primary instance 306a also routes the results of the processing and matching by its transaction processor component 314a2 to the backup instance 306b for backup reconciliation. The result generator component 314a3 of the primary instance 306a generates and queues result, e.g., market data, messages for publication and transmission to other customers/market participants and sends the result/market data messages to the result generator component 314b3 of the backup instance 306a.

In one embodiment, the plurality of components 314a and 314b of the primary instance 306a and the backup instance 306b may include a first, second, third, and fourth component. The first component may include a TR. The TR may be implemented by a TR processor such as the processor 202 described above with respect to FIG. 2. The second component may include a TP. The TP may be implemented by a TP processor such as the processor 202 described above with respect to FIG. 2. The third component may include an RG.

The RG may be implemented by an RG processor such as the processor 202 described above with respect to FIG. 2. The fourth component may include a TL. The TL may include a database for storing the logged transaction and other data and may be implemented by a TL processor such as the processor 202 described above with respect to FIG. 2.

As previously noted, communications between the plurality of components 314a and 314b of the primary instance 306a and the backup instance 306b may take place via an inter-instance communications bus/network which interconnects the instance 306a and the backup instance 306b and may be implemented, at least in part, by the network 220 shown in FIG. 2 and described elsewhere herein.

In particular, corresponding first components 314a1 and 314b1 of the plurality of components 314 of the primary instance 306a and the backup instance 306b may include a TR 314a1 and 314b1 respectively. Corresponding second components 314a2 and 314b2 of the plurality of components 314a of the primary instance 306a and the backup instance 306b may include a TP 314a2 and 314b2 respectively. Corresponding third components 314a3 and 314b3 of the plurality of components 314 of the primary instance 306a and the backup instance 306b may include a RG 314a3 and 314b3 respectively. Corresponding fourth components 314a4 and 314b4 of the plurality of components 314 of the primary instance 306a and the backup instance 306b may include a TL 314a4 and 314a4 respectively.

Figure 6:
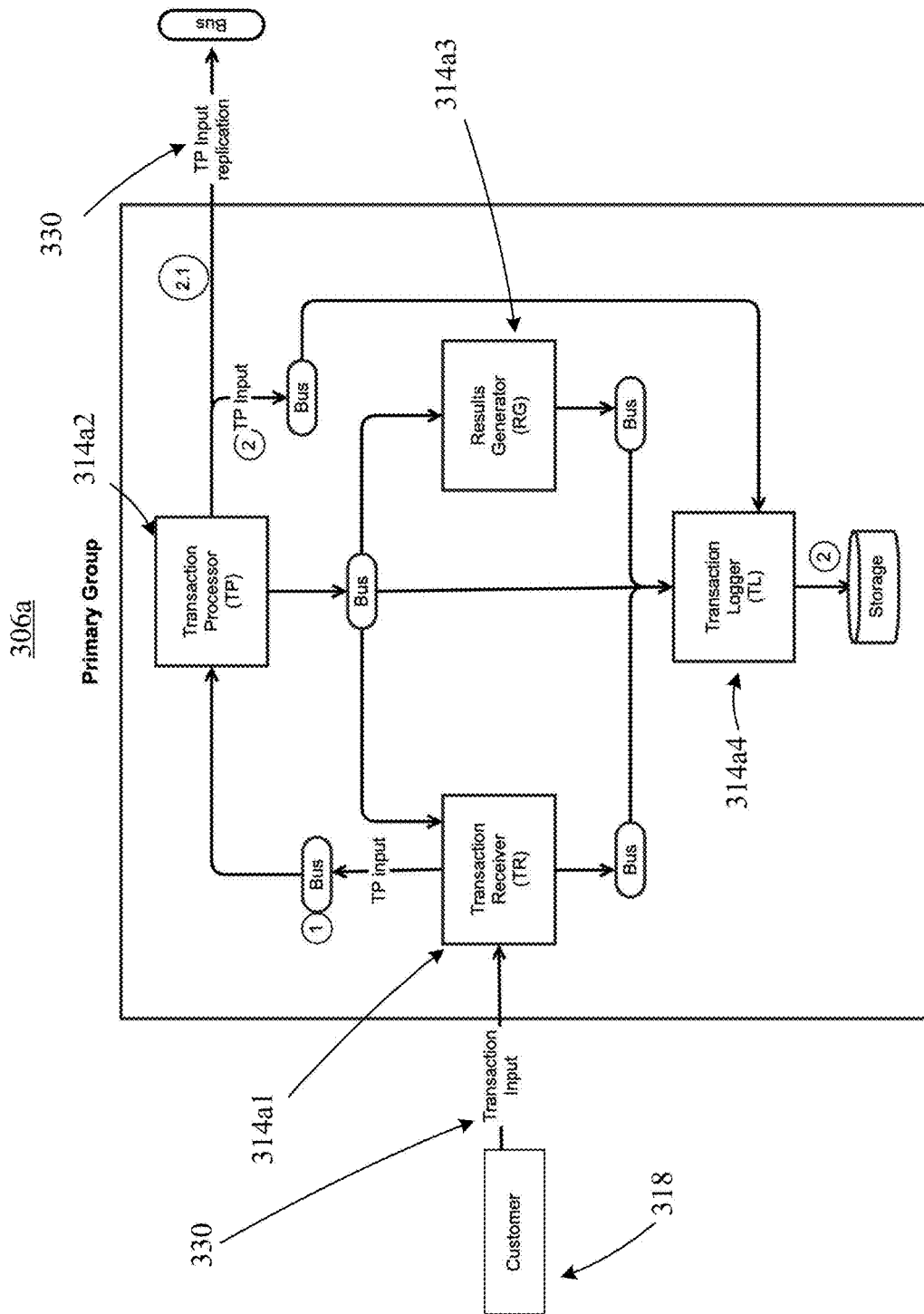
FIG. 6 depicts a block diagram of the inbound message flow into the primary instance according to one embodiment.

FIG. 6 depicts a diagram of the inbound message flow to the primary instance 306a shown in FIG. 5. As noted above, all communication between components of the same instance may be performed via IPC communication (shared memory). All communication between instances may be performed via the electronic communications network 220.

Once the negotiation of which instance is the primary instance and which one is the backup instance is complete, the first fault tolerance processor 316a sends a feedback message to all components 314a, including the TR 314a1, the TP 314a2, the RG 314a3, and the TL 314a4, indicating that each component 314a is part of a primary instance and therefore, the messages may be transmitted to external recipients outside of the system. Similarly, the second fault tolerance processor 316b sends a feedback message to all components 314b, including the TR 314b1, the TP 314b2, the RG 314b3, and the TL 314b4, indicating that each component 314b is part of a backup instance and, therefore, the output messages should not be transmitted to external recipients.

As noted above, interconnects between components may be implemented with message queues, e.g., bus(es) as shown in FIGS. 5-9 which provide buffering between the components. In one embodiment, the customer 318 may submit and transmit an electronic request message (Transaction Input message 330) including data indicative of a trade, via the electronic communications network 220, flowing into the primary instance 306a via the TR 314a1. The TR 314a1 is configured to receive the electronic request message, send confirmation to the customer 318 that the electronic request message has been received, queue the electronic request message, and route, via shared communication, the electronic message to the TP 314a2 for processing. The TP 314a2 is configured to queue a copy of the unprocessed request message (TP input replication/replicated message 330) and to route the copy of the unprocessed request message to the backup instance 306b via the electronic communications network. The TP 314a2 is configured to queue the generated result of the processing and to route the result to the TR 314a1 and to the RG 314a3. The RG 314a3 is configured to generate and queue output market data messages for publication and transmission to other customers/market participants outside of the system. The TR 314a1 is configured to process the result message indicative of the produced result and to queue the result message. The TR 314a1 and the RG 314a3 sends the result message and the RG generated messages to the TL 314a4 for storage and consumption by the regulatory component.

In one embodiment, the queues/buses provide the ability to determine the point of failure. For example, if there is an input message that causes a failure in the TP 314a2, the system 300 is able to isolate, recover from the failure, and avoid a failure in the backup TP 314b2 by using the queues to identify and avoid processing that same input message. In particular, in one implementation, when only a single component is determined to have failed, the input message determined to have been in process by that failed component at the time of failure, as determined based on the those input messages for which a result was produced by the failed component prior to failure, is identified to an operator of the system and recovery by the backup instance is paused until the operator determines that the in-process message was not the cause of the failure.

In one embodiment, the system 300 is configured to ensure that the TP 314a2 in the primary instance 306a fully processes the request message successfully before the TP 314b2 in the backup instance 306b starts processing request message. Therefore, the system 300 provides protection against faulty/corrupted messages which may cause failures in the different components. Further, only successfully processed request messages are stored into the TL database 314a4.

Figure 7:
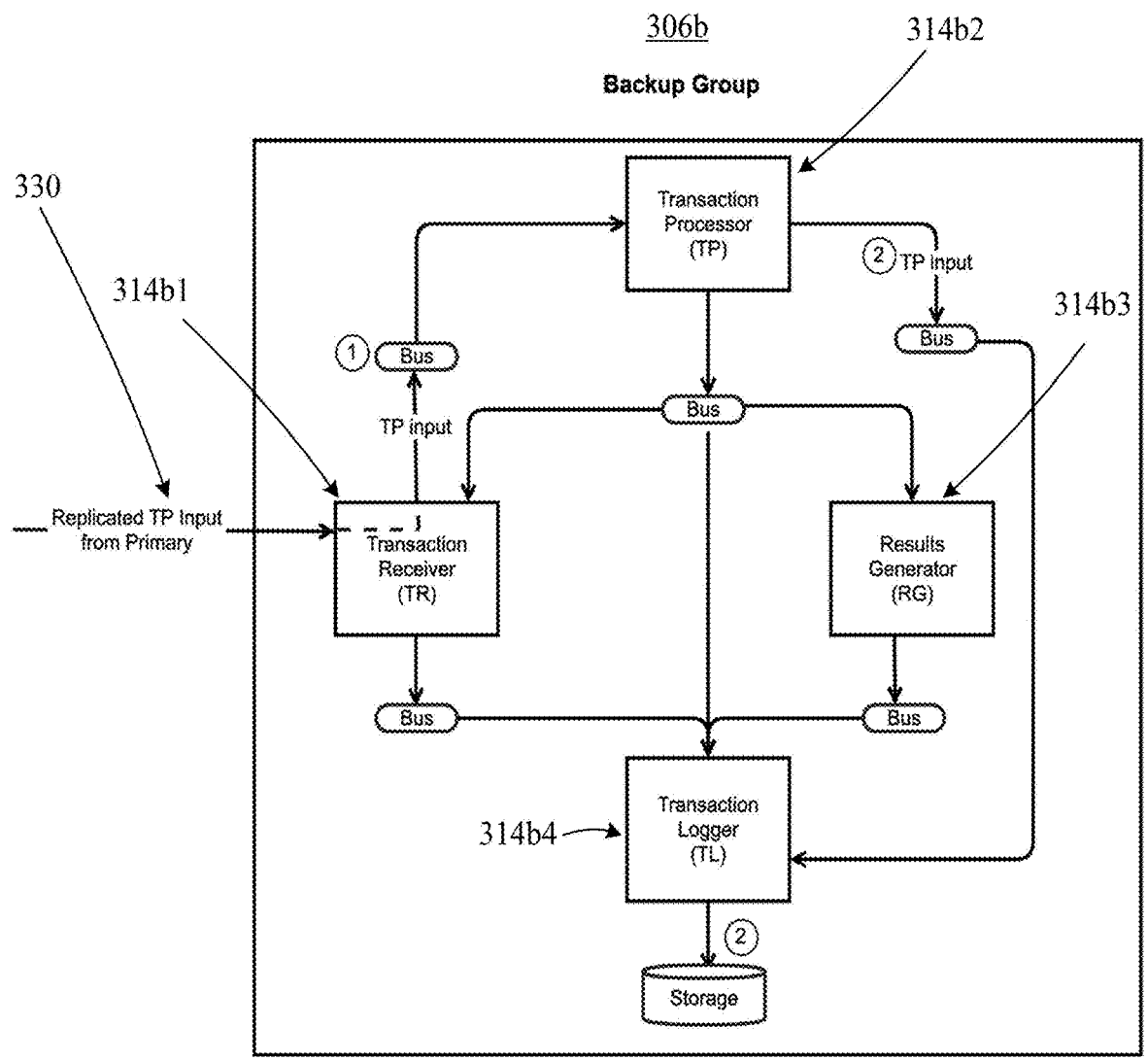
FIG. 7 depicts a block diagram of the input message flow into the backup instance according to one embodiment.

FIG. 7 depicts a block diagram of the input message flow into the backup instance 306b of the system 300 shown in FIG. 3. In general, the primary and backup instances 306a and 306b are identical and include the same components arranged and interconnected in the same manner, e.g., the TR 314b1, the TP 314b2, the RG 314b3, and the TL 314b4 operate in the same manner as their primary instance counterparts e.g., the TR 314a1, the TP 314a2, the RG 314a3, and the TL 314a4. That is, a given instance is capable of operating as either primary or a backup. However, as discussed above, there are a few differences in the way an instance operates depending on whether it is configured as a primary or as a backup. For example, the TR 314b1 receives the incoming request message from the TP 314a2 instead of receiving the incoming request message from the customer 318. Further, as already indicated, each of the components of the backup instance 306b waits until its counterpart in the primary instance 306a has successfully performed the corresponding operation before starting the processing in the backup instance 306b. After all components 314b of the backup instance 306b have processed the copy of the electronic message, then the state of the backup instance 306b should be one step behind the primary instance 306a. Further, the TR 314b1 and the RG 314b3 do not communicate any messages to external recipients.

Figure 8:
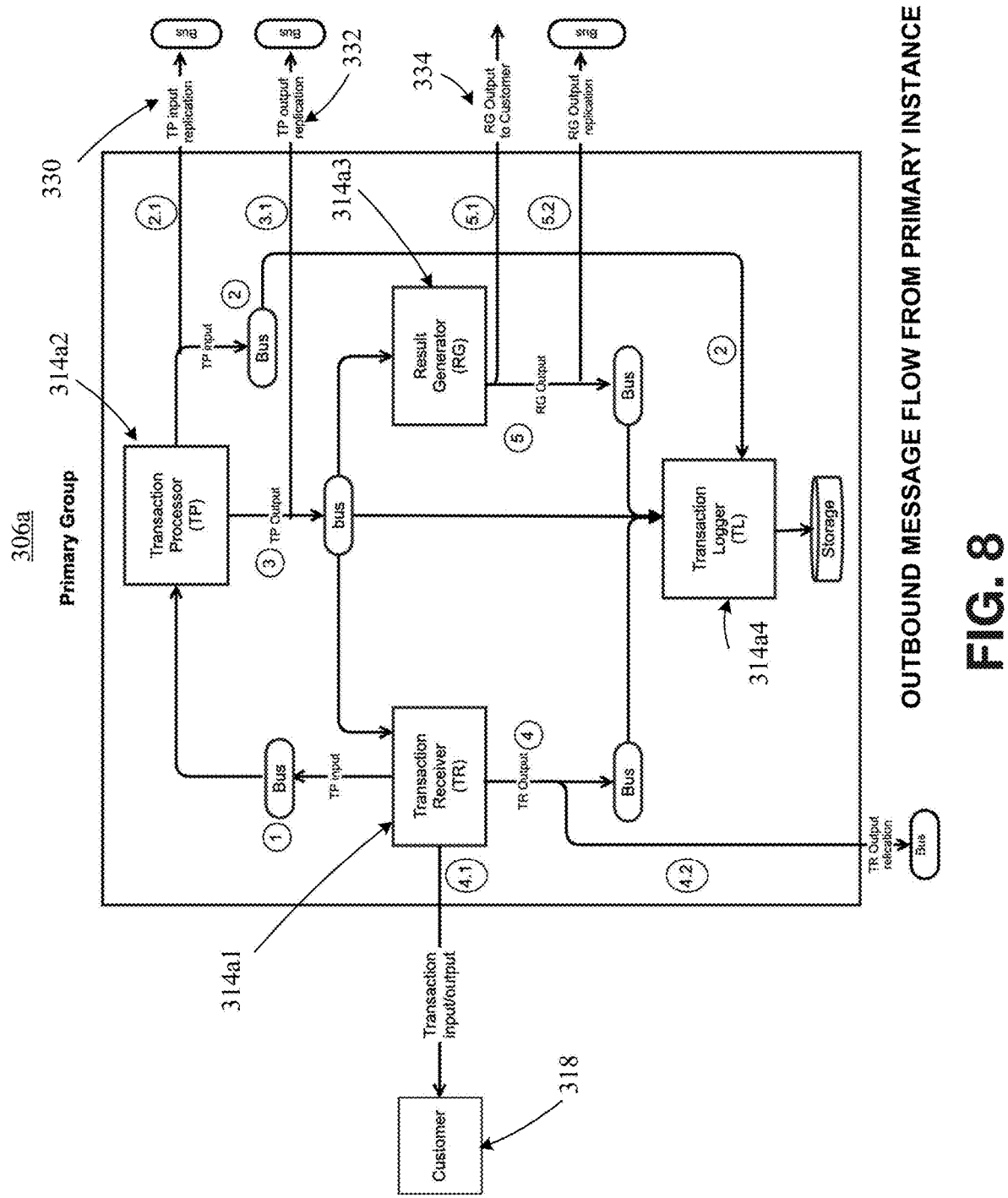
FIG. 8 depicts a block diagram of the outbound message flow from the primary instance according to one embodiment.

FIG. 8 depicts a block diagram of the outbound message flow from the primary instance 306b of the system 300 according to one embodiment. FIG. 9 depicts a block diagram of the outbound message flow from the backup instance of a fault tolerant system according to one embodiment.

In one embodiment, referring to FIGS. 5-9, a first component of the plurality of components 314 of the transaction processing server designated as the primary instance 306a and each of the transaction processing servers designated as the backup instance 306*b* comprises a TR 314*a*1 and 314*b*1 respectively for receiving the electronic request message 330 via the electronic communications network, the electronic request message 330 including data indicative of an order to trade. As mentioned above, the TR 314*b*1 receives the incoming request message 330 from the TP 314*a*2 instead of receiving the incoming request message from the customer 318. A second component of the plurality of components of the transaction processing server designated as the primary instance 306*a* and each of the plurality of transaction processing servers designated as the backup instance 306*b* comprise a TP 314*a*2 and 314*b*2 respectively for receiving and processing the incoming request 330 to identify a previously received request for a transaction counter thereto in an attempt to satisfy one or both of the incoming request 330 and the previously received request.

The TR 314*a*1 of the transaction processing server designated as the primary instance 306*a* is configured to route, via a shared memory, the received request message 330 to the TP 314*a*2 of the primary instance 306*a*. In particular, the received electronic message 330 is queued and then routed to the TP 314*a*2.

The TP 314*a*2 of the transaction processing server designated as the primary instance 306*a* is configured to: receive, via the shared memory, the incoming request message 330, forward, upon receipt of the incoming request message 330, via the electronic communications network, the incoming request message 330 to the TR 314*b*1 of each of the plurality of transaction processing servers designated as the backup instance 306*b*, process the received incoming request 330 to identify a previously received request for a transaction counter thereto in an attempt to satisfy one or both of the incoming request 330 and the previously received request and produce a result 332 based thereof; and forward, via the electronic communications network, the electronic result message 332 to the TP 314*b*2 of each of the plurality of transaction processing servers designated as the backup instance 306*b*.

The TR 314*b*1 of each of the transaction processing servers designated as the backup instance 306*b* is configured to: receive, via the electronic communications network, the incoming request 330 from the TP 314*a*2 of the transaction processing server designated as the primary instance 306*a*; and forward, via a shared memory, the incoming request 330 to the TP 314*b*2 of the corresponding transaction processing server designated as the backup instance 306*b* for backup processing. As shown in FIG. 9, the TR 314*b*1 compares TR primary 334*a* and backup 334*b* outputs/result messages to determine whether the TR 314*a*1 is operating correctly.

The TP 314*b*2 of each of the transaction processing servers designated as the backup instance 306*b* is configured to: receive, via a shared memory, the incoming request 330 from the TR 314*b*1 of the corresponding transaction processing server designated as the backup instance 306*b*; receive, via the electronic communications network, the electronic result message indicative of a primary result from the TP of the transaction processing server designated as the primary instance 306*a*; perform backup processing of the incoming request 330, in response to the receipt of the incoming request 330 and the electronic result message (TP Output from primary 332*a*), wherein the backup processing includes generation of an electronic backup result message (TP output 332*b*) indicative of a backup result; and compare, as shown in FIG. 9, the primary result 332*a* with the backup result 332*b* to determine whether the TP 314*a*2 of the transaction processing server designated as the primary instance 306*a* is operating correctly. In other words, the TP 314*b*2 reconciles the TP outputs 332*a* and 332*b* produced respectively by the TP 314*a*2 of the primary instance and by the TP 314*b*2 of the backup instance.

In one embodiment, a third component of the plurality of components 314*a* of the transaction processing server designated as the primary instance 306*a* and each of the other transaction processing servers designated as the backup instance 306*b* comprise a RG 314*a*3 and 314*b*3 for generating and publishing (only by the RG 314*a*3) a market data message. The RG 314*a*3 of the transaction processing server designated as the primary instance 306*a* is configured to: receive, via the shared communication, from the TP 314*a*2 of the transaction server designated as the primary instance 306*a*, the electronic result message; generate a market data message (RG Output from primary 336*a*) based on the electronic result message; forward, via the electronic communications network, the market data message 336*a* to the RG 314*b*3 of each of the other transaction processing servers designated as the backup instance 306*b*; and distribute, via the electronic communications network, the market data message to the plurality of market participants.

The RG 314*b*3 of each of the other transaction processing servers designated as the backup instance is configured to: receive, via the communications network, from the RG 314*a*3 of the transaction processing server designated as the primary instance 306*a*, the market data message 336*a*; receive, via a shared memory, from the TP 314*b*2 of the transaction processing server designated as a backup instance 306*b*, the backup TP output result 332*b*; generate a backup market data message (RG Output 336*b*), in response to receipt of the market data message, based on the backup result; and compare, as shown in FIG. 9, the backup market data message 336*b* with the primary market data message 336*a* to determine whether the RG 314*a*3 is operating correctly. In other words, the RG 314*b*3 reconciles the outputs RG output 336*a* and 336*b* produced by the RG 314*a*3 of the primary instance 306 and by RG 314*b*3 of the backup instance.

Startup Sequence of Primary Instance

Both the primary and backup components include identical computer executable instructions, but the FT role differentiates how the component operates while assigned the primary role or the backup role.

Figure 10A:
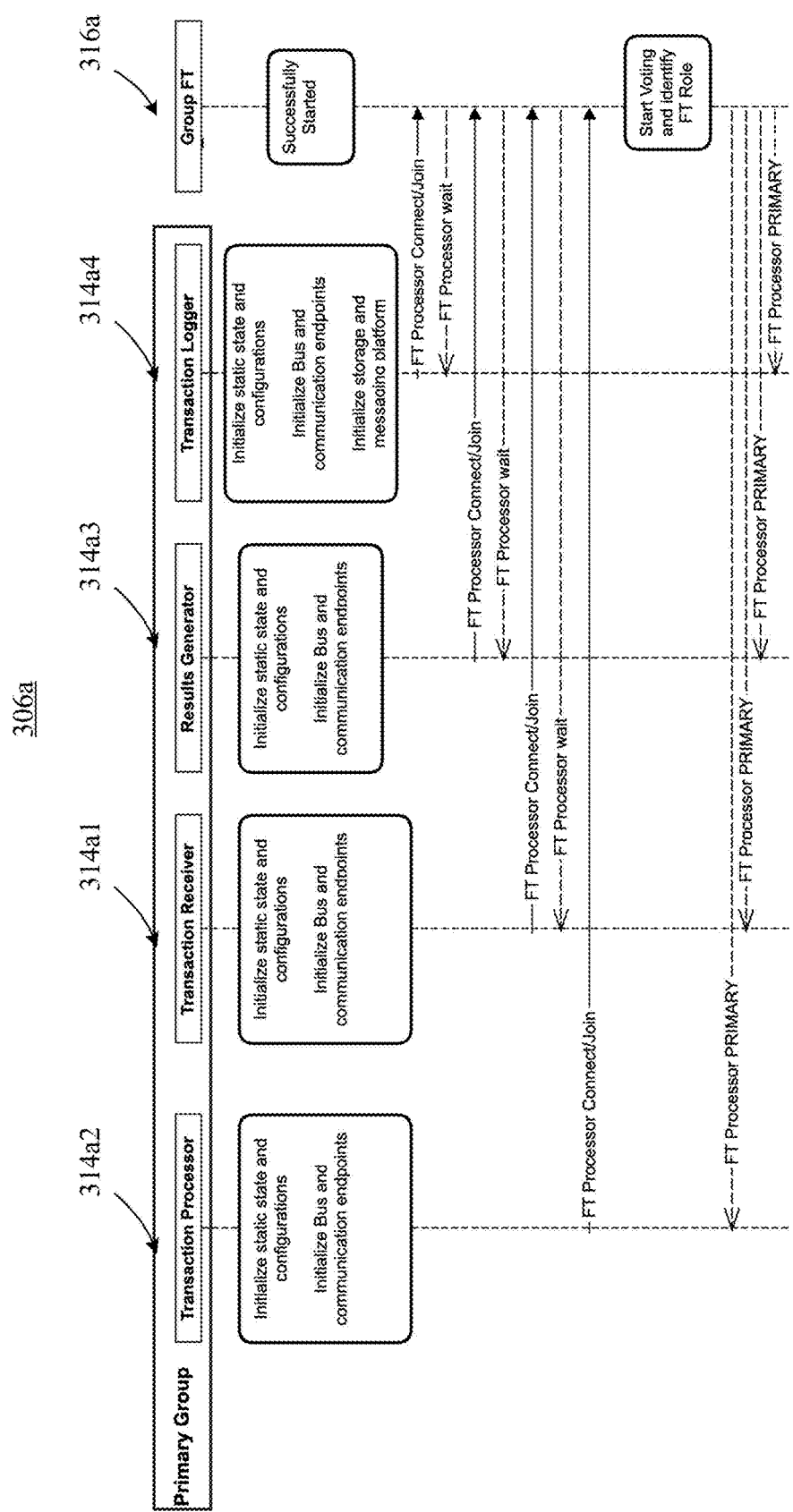
FIGS. 10A and 10B depict a sequence diagram of a startup sequence of a primary instance according to one embodiment.
Figure 10B:
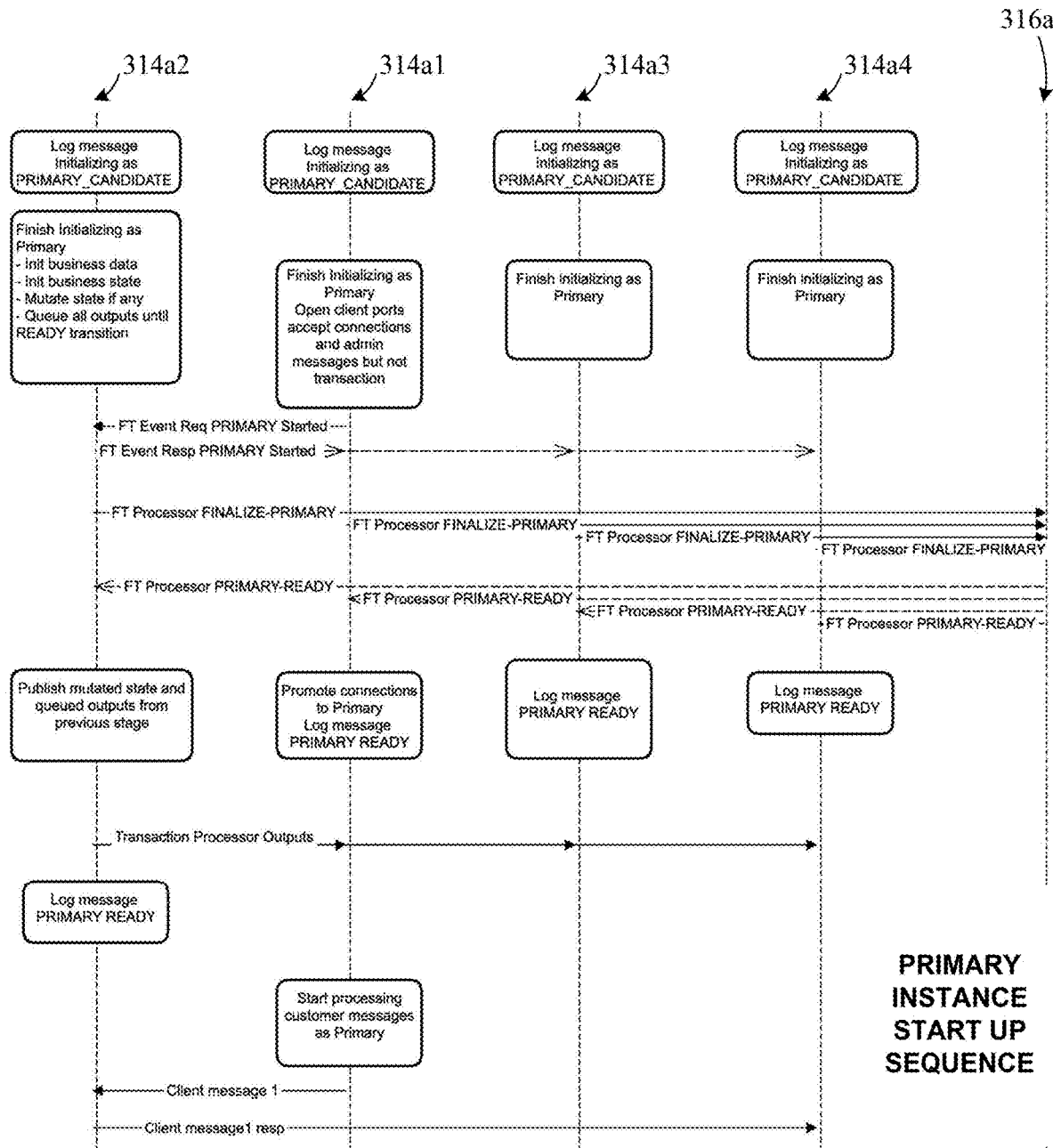

FIGS. 10A and 10B depict a sequence diagram of a startup sequence of a transaction processing server 306*a*, assigned with a primary instance role, of the system 300 shown in FIG. 3.

At startup, the FT 316*a* is configured to startup before the plurality of components/applications 314*a* may start. The FT 316*a* is configured to wait to receive a request from each component to join and register. Once the FT 316*a* has started, the core components 314*a* including the match engine 314*a*2, the TR 314*a*1, the RG 314*a*2, and the TL 314*a*4 components may startup in any order. At startup, the core components 314*a* may initialize, starting with loading static configurations independently from each other and initiating shared memory communication IPC and network communication endpoints. Once each component 314*a* starts, each component is configured to communicate with the corresponding FT 316*a* via the electronic communications network, e.g., via a TCP connection. If any single component 314*a* fails at this stage, the failed component is restarted. Each component 314*a* sends a request to join the group and register with the FT 316*a*. When the FT 316*a* determines that the four components have joined and registered, then the group is finalized. The FT 316*a* communicates with the other FTs 316*b* and 316*c* and starts voting to assign the instance/group with a fault tolerance role of either a primary or a backup role. The FT 316a determines that there is no other instance with a primary role assigned and notifies each registered component 314a residing on the same group or server that they are assigned the primary role. Once each registered component 314a knows that they have been assigned with the primary role, each component 314a finalizes their startup process as a primary component. If any single component 314a is stuck not receiving the primary role, the failed component is restarted. Depending on the role of each component 314a, the startup process is different. Each component 314a starts up independently. However, the components 314a are synchronized via a message status sent by the TR 314a1 via shared memory communication to notify the other components such as the TP 314a2, the RG 314a3, and TL 314a4 that the TR 314a1 has successfully started with the primary role. At this stage, this status message is the only message type that flows through IPC transport (before the FT-FINALIZE-PRIMARY event notification to the FT). Once each component receives the status message that the TR has initialized as primary, then each component may notify the FT 316a that they are ready to start as a primary component (FT-FINALIZE-PRIMARY). The FT 316a then transmits a PRIMARY-READY event message when it has received the FT-FINALIZE-PRIMARY event message from all four components.

In one embodiment, the system 300 may support a configurable timeout for the PRIMARY-READY event call back notification from the time FT-FINALIZE-PRIMARY event is sent to the FT 316a. The corresponding component 314a may shut down if no response is received within this time out window.

In one embodiment, the FT-PRIMARY-READY event call back message from the FT 316a is not transmitted in a sequential order of client connections. Therefore, the components may handle messages being received on IPC transports until the FT-PRIMARY-READY call back is received from the FT 316a. In this case, the component 314a is configured to simply queue the messages received on the IPC transport and only process them after FT-PRIMARY-READY call back notification is received.

Once all of the components 314a are ready to start as primary components, they proceed together, and they can start processing the messages for customers with the primary role.

Startup Sequence of Backup Instance

Figure 11A:
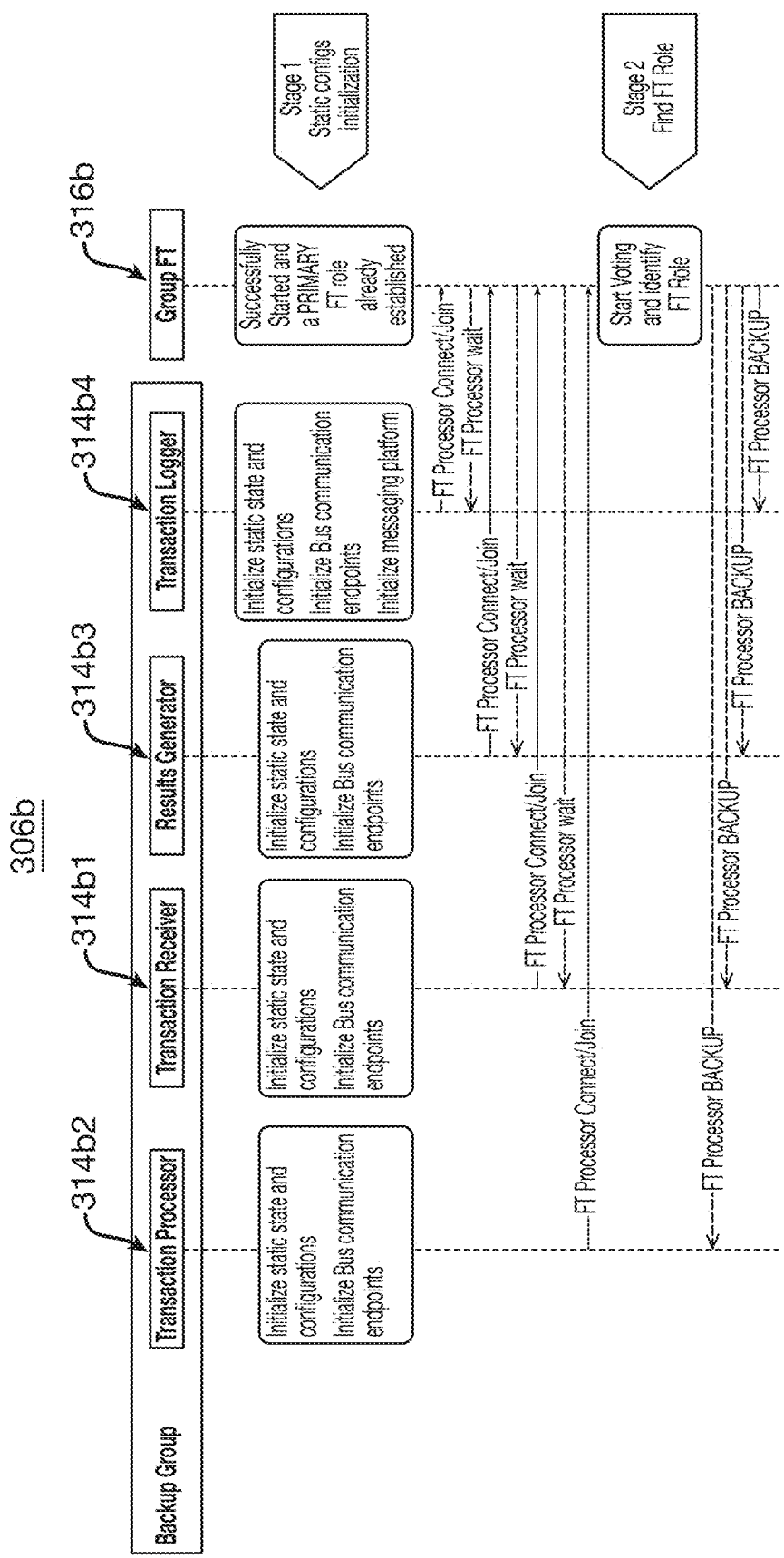

FIGS. 11A-11D depict a sequence diagram of a startup sequence of a transaction processing server 306b, assigned with a backup instance role, of a system 300 including a plurality of startup stages according to one embodiment. In particular, FIG. 11A depicts stages 1-2, FIG. 11B depicts stage 3, FIGS. 11C(1) and 11C(2) depict stages 4-7, and FIG. 11D depicts stage 8.

As shown in FIG. 11A, stage 1 includes the same sequence as the startup sequence of the primary instance 306a discussed above. Stage 1 of the startup sequence includes static configurations and initialization. In particular, the FT 316b is configured to startup before all the plurality of components/applications 314b start. The FT 316b is configured to wait to receive a request from each component 314b to join and register. Once the FT 316b has started, the core components 314b including the match engine 314b2, the TR 314b1, the RG 314b3, and the TL 314b4 components may startup in any order. At startup, the core components 314b may initialize, starting with loading static configurations independently from each other and initiating shared memory communication IPC and network communication endpoints. Once each component 314b starts, each component is configured to communicate with the corresponding FT 316b via the electronic communication network, e.g., via a TCP connection. If any single component 314b fails at this stage, the failed component is restarted. Each component 314b sends a request to join the group and register with the FT 316b. When the FT 316b determines that the four components have joined and registered, then the group is finalized.

Stage 2 includes finding the fault tolerance role. In particular, the FT 316b communicates with the other FTs 316b and 316c and starts voting to assign the instance/group with a fault tolerance role of either a primary or a backup role. The FT 316b determines that there is an existing instance with a primary role assigned and notifies each registered component 314b residing on the same server that they are assigned the backup role.

As shown in FIG. 11B, in stage 3, once each registered component 314b knows that they have been assigned with the backup role, each component 314b finalizes their startup process as a backup component and initialize message bus listeners via the electronic communications network to receive messages from the primary instance 306a. In particular, the TR 314b1 of the backup instance 306b starts listening on the TP input bus for the inputs from the primary instance 306a. The TP 314b2 starts listening on the TP output bus for the outputs of the primary instance 306a. The RG 314b3 of the backup instance 306b starts listening on the RG output bus for the outputs of the primary instance 306a.

As shown in FIGS. 11C(1) and 11C(2), in stage 4, the FT 316b confirms with the different components 314b that the components are ready to send the state requests via the call back messages (FT-FINALIZE-STATE-REQ) and (FT-STATE-REQ-READY).

In stage 5, the TR 314b1 of the backup instance 306b sends a request for the for the current state of the primary instance 306a to its counterpart (the TR 314a1) of the primary instance 306a. Some of the components 314b (the TR 314b1, the match engine 314b2, and the RG 314b3) are configured to synchronize with their counterpart in the primary instance 306a. In particular, these components are configured to wait to receive the current state of their counterpart in the primary instance 306a. In one embodiment, the TL 314b4 of the backup instance 306b does not receive the state from its primary counterpart. In an alternative embodiment, the TL 314b4 of the backup instance 306b receives state information from its primary counterpart so as be synchronized therewith as described herein.

In Stage 6, once the state of each component from the primary instance 306a is received, each component TR 314b1, match engine 314b2, and RG 314b3 of the backup instance 306b finish initialization based on the received state of the corresponding component from the primary instance 306a.

In Stage 7, the components 314b confirm with the FT 316b of the backup instance 306b that they are ready to receive an incoming transaction message, e.g., incoming trade order, processing, i.e., incoming request 330 message for processing. In particular, each component 314b notifies the FT 316b that they are ready to start as a component with the backup role by sending a "FT-FINALIZE-BACKUP" message. The FT 316b then transmits a "FT-BACKUP-READY" when it has received the "FT-FINALIZE-BACKUP" event message from all four components.

As shown in FIG. 11D, in stage 8, the components 314b start processing messages in the backup role as described above.

Figure 13:
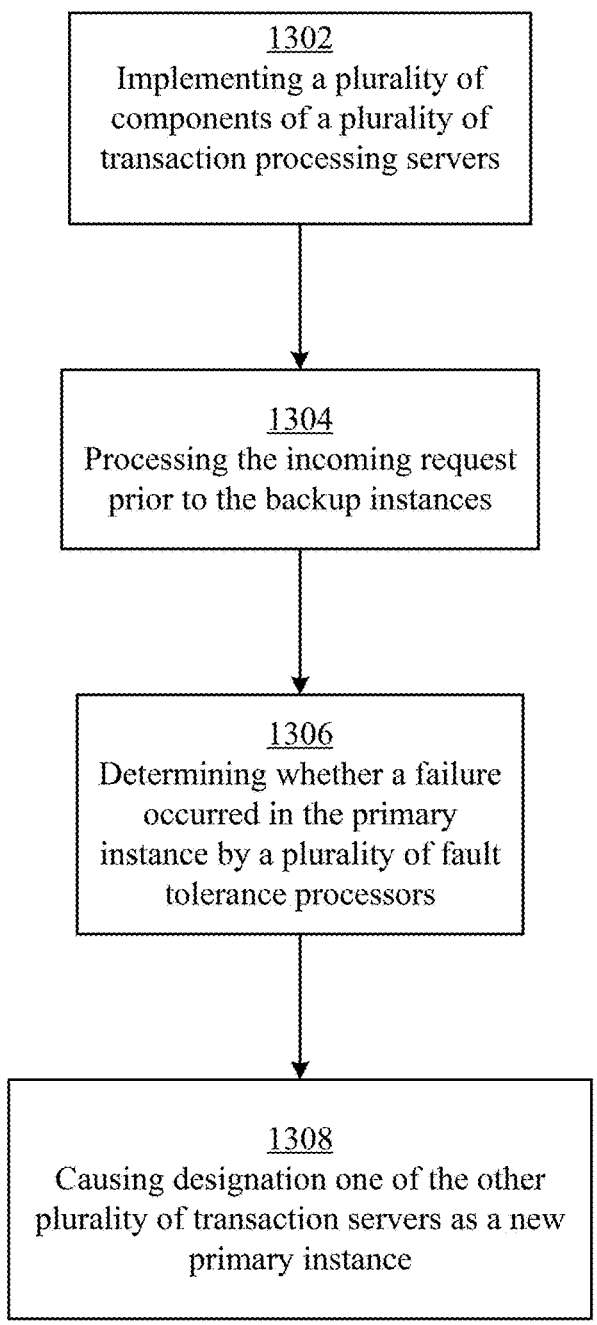
FIG. 13 depicts a flowchart of the operation of an integrated component system according to one embodiment.

FIG. 13 illustrates an example flowchart 1300 of the operation of the system 300 shown in FIGS. 3 and 5. In one embodiment, the operation of an integrated component system 300 includes: implementing, by a processor of each of a plurality of transaction processing servers 306 coupled with each other via an electronic communications network, a plurality of components 314 coupled with each other, each of the plurality of components characterized by a current state and configured to perform one or more of receiving an electronic message, processing the received electronic message and generating an electronic result message indicative of a result of an operation which may alter the current state thereof, wherein one of the plurality of transaction processing servers 306 is designated as a primary instance 306a and each of the other transaction processing servers 306 is designated as a backup instance 306b, wherein each of the plurality of transaction processing servers 306 is operative to receive an incoming request 330 for a transaction, process the received incoming request 330 to identify a previously received request for a transaction counter thereto in an attempt to satisfy one or both of the incoming request 330 and previously received request and generate a result indicative thereof (1302); at least commencing processing, by the transaction processing server 306a designated as the primary instance, of the incoming request 330 prior to each of the other transaction processing servers designated as the backup instance 306b (1304); determining, by each of a plurality of fault tolerance processors 316 coupled with one transaction processing server 306 of the plurality of transaction processing servers, whether a failure has occurred in the transaction processing server designated as the primary instance 306a (1306); and causing, by each of the plurality of fault tolerance processors 316, subsequent to determining that a failure occurred, one of the others of the plurality of transaction processing servers 316 to be designated as a new primary instance (1308).

In one embodiment, determining, whether a failure has occurred includes communicating, by each of the one or more of the plurality of components 314a of the transaction processing server designated as the primary instance 306a, an electronic message indicative of a result of a primary component operation thereof to the corresponding backup component of each of the transaction processing servers designated as the backup instance 306b; and comparing the result of the primary component operation with the result of the backup component operation.

In one embodiment, the plurality of components 314 are coupled with each other via a shared memory architecture.

In one embodiment, the operation of the integrated component system 300 further includes receiving, by each of the other transaction processing servers designated as the backup instance 306b, the incoming request 330 from the transaction processing servers designated as the primary instance 306a.

In one embodiment, the state of each of the plurality of components 314b of each of the other transaction processing servers designated as the backup instance 306b corresponds to the state of each of the plurality of components 314a of the transaction processing server designated as the primary instance 306b subsequent to the processing of an incoming request preceding the incoming request currently being processed by the transaction processing server designated as the primary instance 306a.

In one embodiment, the operation of the integrated component system 300 further includes transmitting, only by the transaction processing server designated as the primary instance 306a, a data message indicative of the generated result of the attempt to satisfy one or both of the incoming request and previously received request to a recipient via the electronic communications network.

In one embodiment, the operation of the integrated component system 300 further includes establishing, by the plurality of fault tolerance processors 316, upon the plurality of transaction processing servers 306 starting up, which of the plurality of transaction processing servers 306 is designated as the primary instance.

In one embodiment, one or more of the plurality of transaction processing servers 306 is located in a geographic region different from a location of one or more others of the plurality of transaction processing servers 306.

In one embodiment, each of the plurality of components 314 of each of the plurality of transaction processing servers 306 are further coupled with the fault tolerance processor 316 coupled with that transaction processing server 306 such that the fault tolerance processor is able to detect a failure of any of the plurality of components 314 coupled therewith.

In one embodiment, each of the plurality of fault tolerance processors 316 is configured to notify the other plurality of fault tolerance processors 316 if a failure of the transaction processing server designated as the primary instance has occurred.

In one embodiment, the failure in the primary instance 306a includes a component failure of any one of the plurality of components of the primary instance 314a.

In one embodiment, the operation of the integrated component system 300 further includes periodically receiving, by each of the plurality of fault tolerant processors 316, a communication from the others of the plurality of fault tolerant processors 316, wherein failing to receive, by each of the plurality of fault tolerant processors 316, the communication from one of the plurality of fault tolerant processors 316 is deemed to indicate a failure of the transaction processing server 306 coupled therewith.

In one embodiment, a first component of the plurality of components comprises a TR for receiving an incoming request 330 for a transaction via the electronic communications network. A second component of the plurality of components comprises a TP for receiving and processing the incoming request 330 to identify a previously received request for a transaction counter thereto in an attempt to satisfy one or both of the incoming request 330 and the previously received request. A third component of the plurality of components comprises an RG for generating and publishing a market data message.

In one embodiment, the operation of the integrated component system 300 further includes routing, by the TR 314a1 of the transaction processing server designated as the primary instance 306a, via a shared memory, the received incoming request 330 to the TP 314a2 of the transaction processing server designated as the primary instance 306a.

In one embodiment, the operation of the integrated component system 300 further includes receiving, by the TP 314a2 of the transaction processing server designated as the primary instance 306a, via a shared memory, the incoming request 330; forwarding, by the TP 314a2 of the transaction processing server designated as the primary instance 306a, via the electronic communications network 220, the received incoming request to the TR 314a3 of each of the other transaction processing servers designated as the backup instance 306b; processing, by the TP 314a2 of the transaction processing server designated as the primary instance 306a, the received incoming request 330 to identify a previously received request for a transaction counter thereto in an attempt to satisfy one or both of the incoming request and the previously received request and produce a result based thereof; generating, by the TP 314a2 of the transaction processing server designated as the primary instance 306a, an electronic result message indicative of a produced result; and forwarding, by the TP of the transaction processing server designated as the primary instance 306a, via the electronic communications network, the electronic result message to the TP 314b2 of each of the other transaction processing servers designated as the backup instance 306b.

In one embodiment, the operation of the integrated component system 300 further includes receiving, by the TR 314b1 of each of the other transaction processing servers designated as the backup instance 306b, via the electronic communications network 220, the incoming request 330 from the TP 314a2 of the transaction processing server designated as the primary instance 306a; and forwarding, by the TR 314b1 of each of the other transaction processing servers designated as the backup instance 306b, via a shared memory, the incoming request 330 to the TP 314b2 of the corresponding transaction processing server designated as the backup instance 306b for backup processing.

In one embodiment, the operation of the integrated component system 300 further includes: receiving, by the RG 314a3 of the transaction processing server designated as the primary instance 306a, via a shared memory architecture, from the TP 314a2 of the transaction server designated as the primary instance 306a, the electronic result message; generating, by the RG 314a3 of the transaction processing server designated as the primary instance 306a, a market data message based on the electronic result message; forwarding, by the RG 314a3 of the transaction processing server designated as the primary instance 306a, via the electronic communications network, the market data message to the RG 314b3 of each of the other transaction processing servers designated as the backup instance 306b; and distributing, by the RG 314a3 of the transaction processing server designated as the primary instance 306a, via the electronic communications network 220, the market data message to a plurality of market participants.

In one embodiment, the operation of the integrated component system 300 further includes receiving, by the TP 314b2 of each of the other transaction processing servers designated as the backup instance 306b, via a shared memory, the incoming request 330 from the TR 314b1 of the corresponding transaction processing server designated as the backup instance 306b; receiving, by the TP 314b2 of each of the other transaction processing servers designated as the backup instance 306b, via the electronic communications network, the electronic result message indicative of a primary result from the TP 314a2 of the transaction processing server designated as the primary instance 306a; performing, by the TP 314b2 of each of the other transaction processing servers designated as the backup instance 306b, backup processing of the incoming request 330, in response to the receipt of the incoming request 330 and the electronic result message, wherein the backup processing includes generation of an electronic backup result message indicative of a backup result; and comparing, by the TP 314b2 of each of the transaction processing servers designated as the backup instance 306b, the primary result with the backup result to determine whether the TP 314a2 of the transaction processing server designated as the primary instance 306a is operating correctly.

In one embodiment, the operation of the integrated component system 300 further includes receiving, by the RG 314b3 of each of the other transaction processing servers designated as the backup instance 306b, via the communications network, from the RG 314a3 of the transaction processing server designated as a primary instance 306a, the market data message; receiving, by the RG 314b3 of each of the other transaction processing servers designated as the backup instance 306b, via a shared memory, from the TP 314b2 of the corresponding transaction processing server designated as a backup instance 306b, the backup result; generating, by the RG 314b3 of each of the other transaction processing servers designated as the backup instance 306b, a backup market data message, in response to receipt of the market data message, based on the backup result; and comparing, by the RG 314b3 of each of the other transaction processing servers designated as the backup instance 306b, the backup market data message with the market data message to determine whether the RG of the transaction processing server designated as the primary instance 306a is operating correctly Fault Tolerant System As noted above, the system 300 provides fault tolerance features to be able to handle fault tolerance in an integrated component system environment.

Figure 12B:
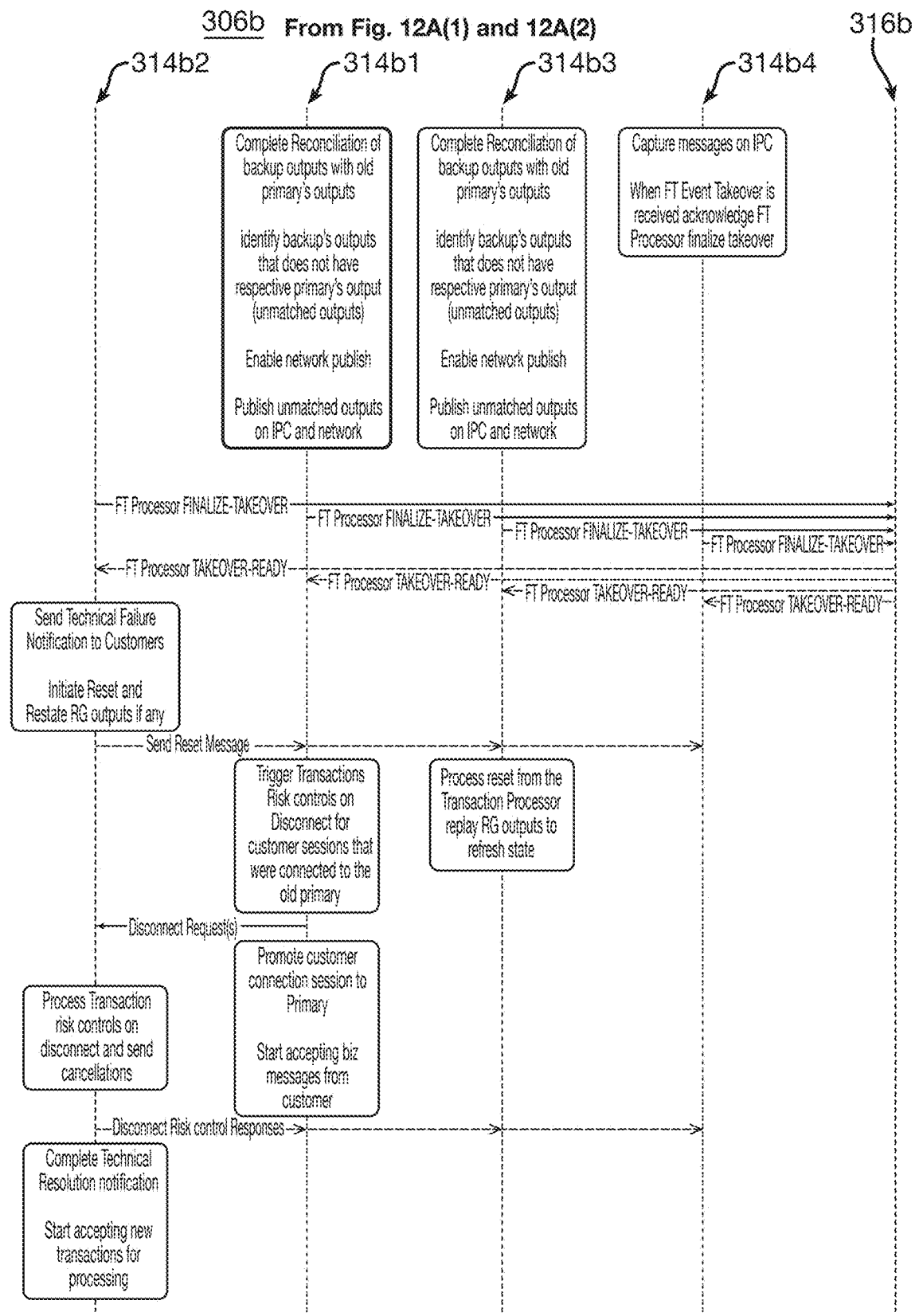
FIGS. 12A(1), 12A(2), 12A(3), and 12B depict a sequence diagram of a failover sequence of a backup instance in a fault tolerant system.

FIG. 12 depicts a sequence diagram of a failover sequence of a backup instance 306b in a fault tolerant system 300 as shown in FIG. 3.

In one embodiment, the system 300 includes a plurality of transaction processing servers 306 coupled with each other via an electronic communications network. Each of the plurality of transaction processing servers 306 includes a processor which implements a plurality of components 314 coupled with each other. Each of the plurality of components 314 is characterized by a current state and is configured to perform one or more of receiving an electronic message, processing the received electronic message and generating an electronic result message indicative of a result of an operation which may alter the current state thereof. One of the plurality of transaction processing servers 306 is designated as a primary instance 306a and each of the other transaction processing servers 306 is designated as a backup instance 306b. Each of the plurality of transaction processing servers 306 is operative to receive an incoming request for a transaction, process the received request to identify a previously received request for a transaction counter thereto in an attempt to satisfy one or both of the incoming request and previously received request and generate a result indicative thereof. The transaction processing server designated as the primary instance 306a at least commences processing of the incoming request prior to each of the other transaction processing instances designated as the backup instance. The one or more of the plurality of components 514a of the transaction processing server designated as the primary instance 306a are each configured to communicate an electronic result message indicative of a result of an operation thereof to the corresponding component 314b of each of the other transaction processing servers designated as the backup instance 306b.

In one embodiment, only the transaction processing server designated as the primary instance 306 is configured to transmit a data message indicative of the generated result of the attempt to satisfy one or both of the incoming request and previously received request to a recipient external to the system.

The system 300 further includes a plurality of fault tolerance processors 316a, 316b, and 316c. Each of the plurality of fault tolerance processors 316a, 316b, and 316c is coupled with one transaction processing server 306a, 306b, and 306c of the plurality of transaction processing servers 306 respectively. Each the plurality of fault tolerance processors 316a, 316b, and 316c is configured to determine that a failure has occurred in the transaction processing server designated as the primary instance 306a and, subsequent thereto, cause one of the others of the plurality of transaction processing servers 306b to be designated as a new primary instance. The transaction processing server which is designated as the new primary instance 306b is configured to synchronize the current state of each of the plurality of components 314b thereof based on the received electronic messages indicative of a result of the operation the corresponding component 314a of the primary instance 306a, and process any incoming requests not processed by the primary instance 306a before commencing processing of new incoming requests.

In one embodiment, the state of each of the plurality of components 314b of each of the other transaction processing servers designated as the backup instance 306b corresponds to the state of each of the plurality of components 314a of the transaction processing server designated as the primary instance 306a subsequent to the processing of an electronic transaction message preceding the electronic transaction message currently being processed by the transaction processing server designated as the primary instance 306a.

In one embodiment, the plurality of fault tolerance processors 316, establish, upon the plurality of transaction processing servers starting up, which of the plurality of transaction processing servers is designated as the primary instance 306a.

In one embodiment, each of the plurality of components 314 of each of the plurality of transaction processing servers 306 are further coupled with the fault tolerance processor 316 coupled with that transaction processing server such that the fault tolerance processor is able to detect a failure of any of the plurality of components.

In one embodiment, only a failure in the transaction processing server 306a or the fault tolerance processor 316a of the transaction processing server designated as the primary instance causes one of the others of the plurality of transaction processing servers 306b to be designated as a new primary instance 306a. In other words, only a failure in the primary instance 306a or the fault processor 306b causes a failover process to occur. If a transaction processing server designated as the backup instance 306b, the corresponding fault tolerance processor 316b, or any of the corresponding components 314b fail, the transaction processing server designated as the primary instance 306a continues to operate without that backup instance 306b and the failed backup instance 306b may be brought down. In one embodiment, an operator of the system may be notified to recognize that another backup instance 306b needs to be started, particularly if the failed backup instance 306b was the only backup instance 306b. In an alternative embodiment, where all available backup instances 306b have failed, the fault tolerance processor 316a of the primary instance 306a may shut down the primary instance 306a, e.g., performing a graceful shutdown where the operator or traders are notified and all in process transactions are completed, so as to minimize the possibility of lost transactions should the primary instance 306a fail with no backup instance 306b synchronized therewith and ready to take over.

Failures in the primary instance 306a may occur due to a failure on one of the components in the primary instance 306a, a failure in the fault tolerance processor 316a, a failure in the network, e.g., preventing communications with the primary instance 306a, a failure in communication with the transaction processing server 306a designated as the primary instance, a failure due to a message that cannot be processed by the transaction processing server 306a designated as the primary instance primary instance 306a or which causes a processing fault, e.g., a faulty message, a catastrophic failure in the transaction processing server 306a designated as the primary instance, e.g., the hardware server box fails due to a power outage or other catastrophic event, and the like.

In one embodiment, each of the plurality of fault tolerance processors/FT 316a, 316b, and 316c is configured to determine whether a failure occurred in the transaction processing server designated as the primary instance 306a. In other words, a failure that occurs in the primary instance 306a may be detected by any of the plurality of fault tolerance processors 316a, 316b, and 316c.

In one embodiment, each of the plurality of tolerance processors 316a, 316b, and 316c is configured to notify the other plurality of fault tolerance processors 316a, 316b, and 316c if a failure in the transaction processing server designated as the primary instance 306a occurred.

In one embodiment, the failure in the primary instance 306a may include a component failure in any one of the plurality of components 314a of the primary instance 306a.

In one embodiment, each of the plurality of components 314a is configured to, when capable, notify the corresponding fault tolerance processor 316a that it has failed. For example, where a component 314a is unable to complete an external operation, such as database commit, or otherwise detects an internal fault, it may notify the corresponding fault tolerance processor 316a that it is unable to continue to operate properly. In one embodiment, the failed component intentionally, or unintentionally as a byproduct of the failure, may close some or all shared memory and network communications and proceed to shut down, or await being shut down, which may then be detected, e.g., via being non-responsive or via the detection of the closure of a communications channel, by the corresponding fault tolerance processor 316a as an indication of failure. As described herein, active notification by a component of its failure may be combined with the passive failure detection described herein, e.g., via detection of a lost, dropped or closed connection, failure to receive a heartbeat communication within a threshold period of time, and/or failure to respond to a communication necessitating a reply within a threshold time period, etc.

In one embodiment, each of the plurality of fault tolerant processors 316a, 316b, and 316c periodically receives a communication from the others of the plurality of fault tolerant processors. A failure to receive the communication from one of the plurality of fault tolerant processors 316a, 316b, and 316c is deemed to indicate a failure of the transaction processing server 306 coupled therewith. For example, a failure to receive the communication from the fault tolerant processor 316a which is coupled with the primary instance 306c is deemed to indicate a failure in the primary instance 306a.

In one embodiment, the communication may include a heartbeat message. If a heartbeat message is not received by a threshold time, e.g., 10 seconds, a failure is deemed to have occurred.

In one embodiment, upon receipt of the electronic result message indicative of the result of the operation of the one or more of the plurality of components 314a of the primary instance 306a, the corresponding component 314b of each of the other transaction processing servers designated as the backup instance 306b compares a result of the operation thereof with the result indicated by the received electronic result message to determine whether one of the plurality of components of the transaction processing server designated as the primary instance or the corresponding component of each of the other transaction processing servers designated as the backup instance is operating correctly.

In one embodiment, when a fault tolerance processor of the plurality of fault tolerance processors 316a, 316b, or 316c determines that a failure occurred in the primary instance 306a, the plurality of fault tolerance processors 316a, 316b, or 316c are configured to designate one of the others of the plurality of transaction processing servers as a new primary instance. In particular, once a failure occurs in the primary instance 306a, the fault tolerance processors 316a, 316b, and 316c are configured to vote and agree on a new primary instance.

In one embodiment, as shown in FIGS. 12A(1), 12A(2), 12A(3), and 12B, the backup instance 316b is designated by the plurality of fault tolerance processors 316a, 316b, and 316c as the new primary instance. The FT 316b may notify each registered component 314b residing on the same server that they will become part of the new primary instance and may transmit a "PRIMARY" message.

In one embodiment, all instances including the primary instance 306a and the backup instance 306b may include a queue/bus configured to store previously received messages. The backup instance 306b that is designated as the new primary instance is configured to retrieve the stored request messages from the queue and process all of the stored request messages, generate an electronic result message indicative of a backup output result based on the processing, and synchronize all of the plurality of components 314b before becoming the new primary instance.

In one embodiment, the electronic message indicative of the result of the operation of the transaction processing server designated as the primary instance 306a includes a primary result output. The electronic result message indicative of the result of the operation of each of the plurality of transaction processing servers designated as the backup instance includes a backup result output.

In one embodiment, at least a subset of the plurality of components 314b of the transaction processing server 306b designated as the new primary instance are configured to complete a reconciliation of the backup result output with the primary result output.

In one embodiment, at least a subset of the plurality of components 314b of the transaction processing server 306b designated as the new primary instance are configured to identify a backup result output that does not have a respective primary instance result output and publish an unmatched result output via the shared memory communication. This unmatched result output may be communicated to the fault tolerance processor of the transaction processing server 306b designated as the new primary instance and/or to a system operator to determine whether the unmatched output is based on the failure from which recovery is occurring and to determine whether any reprocessing is needed.

In one embodiment, when the fault tolerance processor 316a of the plurality of fault tolerance processors 316 coupled with the primary instance 316a determines that the failure has occurred in the primary instance, each of the plurality of fault tolerance processors 316 is configured to cause the primary instance to at least de-couple from the others of the plurality of transaction processing servers. In one embodiment, each of the plurality of fault tolerance processors 316 is configured to cause the primary instance to de-couple from the electronic communications network 220.

In one embodiment, the plurality of components 314b may include a TR 314b1, a TP 314b2, an RG 314b3, and a TL 314b4. Subsequent to receiving the notification to become a primary component, the plurality of components 314b may perform pre-requisite tasks in preparation to take over as a primary component. In particular, before the transaction processing server 306b designated as the new primary instance may takeover, the plurality of components 314b need to be synchronized. In particular, as described below, coordination between the plurality of components 314b may be accomplished via status messages via shared memory communication.

Therefore, a synchronizing process described below coordinates all of the plurality of components 314b of the transaction processing server 306b designated as the new primary to process any electronic messages received before and after the failure occurred.

In one example, the TR 314a1 may be processing message 9, while the TP 314a2, is processing message 8, the RG 314a3 is processing message 6, and the TL 314a4 is processing message 4. If the TR 314a1 fails when processing message 9, then it notifies the other components so they know they will not receive message 9. The TR 314a1 also notifies the transaction processing server 306a that a failure occurred at message 9. The transaction processing server 306a designated as primary instance continues to queue messages until all components on the transaction processing server 306b designated as the new primary instance have caught up in processing messages 1-8 before it can become the primary instance and creates a save state. This ensures that all messages are being processed sequentially and all messages have been processed before failing over to the transaction processing server 306b designated as the new primary instance.

In particular, at this stage, the TR 314b1 leads the coordination of the plurality of components 314b. The TR 314b1 may continue to listen for copies of electronic messages (TP input 330) and flush all queued inputs including copies of electronic messages previously received from the failed primary instance 306a. The TP 314b2, the RG 314b3, and the TL 314b4 may continue to process any queued inputs as a backup instance until a takeover message is received, e.g., a "NCSS takeover" from the TR 314b1.

Once all queued inputs from the failed primary instance 306a have been flushed, the TR 314b1 may notify the TP 314b2 and may transmit a takeover message, e.g., a "NCSS takeover".

When the takeover message is received, some of the plurality of components 314b of the transaction processing server 306b designated as the new primary instance may be configured to complete reconciliation of backup result outputs with primary result outputs, identify backup result outputs that do not have respective primary instance result outputs, and publish unmatched result outputs via the shared memory. The reconciliation of backup result outputs enables the system 300 to confirm that the transaction server designated as the new primary instance backup is in a healthy state, that it has caught up with the primary instance up until the point of failure, and that it is safe for the transaction processing server 306b to take over as the new primary instance. Where the reconciliation fails, the backup instance 306b may be determined to have failed and the recovery process then begins again with another backup instance. Alternatively, it may be determined that recovery is not possible.

In particular, at this stage, the TP 314b2 leads the coordination of the plurality of components 314b. The TP 314b2 is configured to complete reconciliation of corresponding backup result outputs with primary result outputs, identify backup result outputs that do not have respective primary instance outputs, and publish unmatched outputs via the shared memory communication to the other plurality of components 314b, e.g., to identify those transactions which must be reprocessed thereby. Further, the TP 314b2 publishes the unmatched outputs via the electronic communication network 220. The TP 314b2 is configured to transmit, via the shared memory, the takeover message to the other plurality of components 314b including the TR 314b1, the RG 314b3, and the TL 314b4. When the takeover message is received, the TR 314b1 and the RG 314b3 are also configured to complete the same tasks including completing reconciliation of corresponding backup outputs with primary outputs, identify backup outputs that do not have respective primary instance outputs, and publish unmatched result outputs via the shared memory. When the takeover message is received, the TL 314b4 does not perform any reconciliation. Instead, the TL captures 314b4 messages via the shared memory communication and acknowledges the takeover.

Each of the plurality of components 314b of the transaction processing server 306b designated as the new primary instance may notify the fault processor 316a to finalize the takeover as the new primary instance via a finalize takeover message, e.g. "FINALIZE-TAKEOVER.".

When the fault processor 316b receives the finalize takeover message from each of the plurality of components 314b, the fault processor 316b notifies each of the plurality of components 314b that each of the plurality of components 314b is ready to take over as a new primary instance by transmitting a takeover ready message, e.g., "TAKEOVER-READY" message.

When the TP 314b2 receives the takeover ready message, the TP 314b2 sends a Technical Failure notification to customers. At this stage, the TP 314b2 does not accept any new electronic messages including orders from anyone for a specific time, e.g., 10 seconds. The TP 314b2 then initiates a "Reset" process to reinstate current order books states based on the backup state, process cancel on disconnect and sends cancellations, and starts accepting new electronic messages with new orders for processing as the new primary instance. The "Reset" process enables recovery in case the connection with customers is lost. In this case, customers would miss some messages and their order books may not synchronized. The "Reset" process includes cleanly resetting the order books and reinstating the order books based on the backup state. Therefore, any stale messages from the customers are cleaned. When the "Reset" process is successful, the TP 314b2 notifies the TR 314b1 via a channel reset message.

When the TR 314b1 receives the channel reset message, the TR 314b1 triggers a cancel to disconnect TCP connections, e.g., TM connections, that were connected with the transaction processing server 306a designated as the old primary instance. The TP 314b2 processes the disconnection, cancels the orders before accepting new orders, and sends cancellation notices to the customers.

The TP 314b2 completes the "Reset" and starts accepting new orders for processing.

At this stage, the transaction processing server 306b designated as the new primary instance becomes the primary instance. Each of the other transaction processing servers designated as a backup instance continues to operate by receiving incoming requests from the new primary instance after a synchronization process with the new primary instance.

Figure 14:
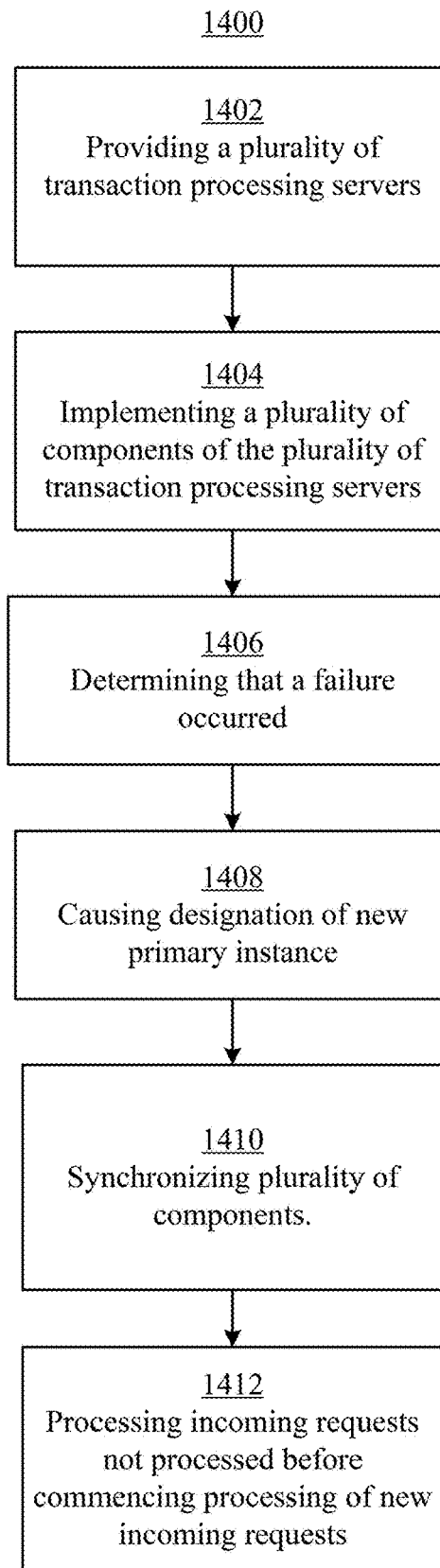
FIG. 14 depicts a flowchart of the operation of a fault tolerant system according to one embodiment.

FIG. 14 illustrates an example flowchart 1400 of the operation of the fault tolerance system 300 shown in FIGS. 3 and 5. In one embodiment, the operation of the system 300 includes: providing a plurality of transaction processing servers 306 coupled with each other via an electronic communications network 220, each of the plurality of transaction processing servers 306 comprising a processor (1402); implementing, by the processor of each of the plurality of transaction processing servers 306, a plurality of components 314 coupled with each other, each of the plurality of components 314 characterized by a current state and configured to perform one or more of receiving an electronic message, processing the received electronic message and generating an electronic result message indicative of a result of an operation which may alter the current state thereof, wherein one of the plurality of transaction processing servers is designated as a primary instance 306a and each of the other transaction processing servers is designated as a backup instance 306b, wherein each of the plurality of transaction processing servers 306 is operative to receive an incoming request for a transaction, process the received request to identify a previously received request for a transaction counter thereto in an attempt to satisfy one or both of the incoming request and previously received request and generate a result indicative thereof, the transaction processing server designated as the primary instance 306a at least commences processing of the incoming request prior to each of the transaction processing servers designated as the backup instance 306b, wherein the one or more of the plurality of components 314a of the transaction processing server designated as the primary instance 306a are each configured to communicate an electronic result message indicative of a result of an operation thereof to the corresponding component of each of the other transaction processing servers designated as the backup instance 306b (1404); determining, by a plurality of fault tolerance processors 316, each of the plurality of fault tolerance processors coupled with one transaction processing server of the plurality of transaction processing servers, that a failure has occurred in the transaction processing server designated as the primary instance 306a (1406); causing, by the plurality of fault tolerance processors 316, one of the others of the plurality of transaction processing servers to be designated as a new primary instance (1408); synchronizing, by the transaction processing server which is designated as the new primary instance, the current state of each of the plurality of components thereof based on the received electronic messages indicative of a result of the operation the corresponding component of the primary instance (1410); and processing, by the transaction processing server, any incoming requests not processed by the primary instance before commencing processing of new incoming requests (1412).

In one embodiment, upon receipt of the electronic result message indicative of the result of the operation of the one or more of the plurality of components of the primary instance, the corresponding component of each of the other transaction processing servers designated as the backup instance compares a result of the operation thereof with the result indicated by the received electronic result message to determine whether one of the plurality of components of the transaction processing server designated as the primary instance or the corresponding component of each of the other transaction processing servers designated as the backup instance is operating correctly.

In one embodiment, the operation of the system 300 further includes transmitting, by only the transaction processing server designated as the primary instance 306*a*, a data message indicative of the generated result of the attempt to satisfy one or both of the incoming request and previously received request to an external recipient.

In one embodiment, the operation of the system 300 further includes receiving periodically, by each of the plurality of fault tolerant processors 316, a communication from the others of the plurality of fault tolerant processors, wherein a failure to receive the communication from one of the plurality of fault tolerant processors is deemed to indicate a failure of the transaction processing server coupled therewith.

In one embodiment, each of the plurality of components 314 of each of the plurality of transaction processing servers are further coupled with the fault tolerance processor 316 coupled with that transaction processing server 306 such that the fault tolerance processor 316 is able to detect a failure of any of the plurality of components 314.

In one embodiment, the state of each of the plurality of components 314*b* of each of the other transaction processing servers designated as the backup instance 306*b* corresponds to the state of each of the plurality of components 314*a* of the transaction processing server designated as the primary instance 306*a* subsequent to the processing of an electronic transaction message preceding the electronic transaction message currently being processed by the transaction processing server designated as the primary instance 306*a*.

In one embodiment, the operation of the system 300 further includes establishing, by the plurality of fault tolerance processors 316, upon the plurality of transaction processing servers 306 starting up, which of the plurality of transaction processing servers is designated as the primary instance 306*a*.

In one embodiment, each of the other transaction processing servers designated as the backup instance 306*b* includes a queue configured to store previously received electronic messages from the transaction processing server designated as the primary instance 306*a*. In one embodiment, the transaction processing server which is designated as the new primary instance is configured to process all of the electronic messages stored in the queue before becoming the new primary instance.

In one embodiment, the electronic result message indicative of the result of the operation of the transaction processing server designated as the primary instance 306*a* includes a primary result output. The electronic result message indicative of the result of the operation of each of the other transaction processing servers designated as the backup instance includes a backup result output.

In one embodiment, at least a subset of the plurality of components 314 of the transaction processing server designated as the new primary instance are configured to complete a reconciliation of the backup result output with the primary result output.

In one embodiment, at least a subset of the plurality of components 314 of the transaction processing server designated as the new primary instance are configured to identify a backup result output that does not have a respective primary instance result output and publish an unmatched result output via a shared memory architecture.

In one embodiment, when the fault tolerance processor of the plurality of fault tolerance processors coupled with the primary instance 306*a* determines that the failure has occurred in the primary instance, causing, by each of the plurality of fault tolerance processors, the primary instance 306*a* to at least de-couple from the others of the plurality of transaction processing servers.

In one embodiment, a first component of the plurality of components comprises a TR for receiving the electronic message via the electronic communications network, the electronic message including data indicative of an order to trade. A second component of the plurality of components comprises a TP for matching the received order to trade with one or more of previously received unmatched orders which are counter thereto. A third component of the plurality of components comprises an RG for generating and publishing a market data message.

Figure 15:
FIG. 15 depicts a flowchart of the operation of an integrated component and fault tolerant system with different state transitions.

FIG. 15 depicts the state transitions of the FTs including startup, designation of primary and backup roles, failure detection, and primary take over.

In one embodiment, an operation 1500 of the system 300 includes: initializing, by a FT 316*a*; coupling, by the FT 316*a*, with a candidate instance 306*a* including a plurality components 314*a*; waiting, by a FT 316*a* for the plurality of components 314*a* to join or register in the group; voting, by the FTs 316, for a role including primary or backup to be assigned to the candidate instance 306*a*; designating the instance 306*a* as a primary candidate 306*a*; performing a health check of the primary candidate 306*a*; initializing, by the primary candidate instance 306*a*, a primary specific state; finalizing, by the FT 316*a*, the designation of the instance 306 as a primary instance, waiting for the plurality of components 314*a* to be ready, designating the primary candidate as Primary ready; and promoting the primary candidate to a primary instance 306*a*.

In one embodiment, the operation 1500 of the system 300 includes: initializing, by a FT 316*b*; coupling, by the FT 316*b*, with a candidate instance 306*b* including a plurality components 314*b*; waiting, by a FT 316*b* for the plurality of components 314*b* to join or register in the group; voting, by the FTs 316, for a role including primary or backup to be assigned to the candidate instance 306*b*; designating the instance 306*b* as a backup candidate 306*b*; performing a health check of the primary candidate 306*b*; initializing, by the backup candidate instance 306*b*, a backup specific state; finalizing the initializing of the backup candidate instance 306*b* as a backup instance; waiting for the plurality of components 314*b* to be ready; designating the backup candidate instance as Backup ready; and promoting the backup candidate instance to a backup instance 306*b*.

In one embodiment, the operation 1500 further includes, detecting, by any of the plurality of FTs, a failure in the primary instance 306*a*; designating, by the FTs the backup instance 306*b* as the new primary instance; processing, by the backup instance 306*b*, all transaction messages to synchronize the state; initiating the takeover; taking over as a new primary instance; finalizing the takeover as a new primary instance; becoming a new primary instance; and processing new transaction messages.

CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. A system comprising:
a plurality of transaction processing servers coupled with each other via an electronic communications network, each of the plurality of transaction processing servers comprising a processor which implements a plurality of components coupled with each other, each of the plurality of components characterized by a current state and configured to perform one or more of receiving an electronic message, processing the received electronic message and generating an electronic result message indicative of a result of an operation which may alter the current state thereof, wherein one of the plurality of transaction processing servers is designated as a primary instance and each other of the plurality of transaction processing servers is designated as a backup instance, wherein each of the plurality of transaction processing servers is operative to receive an incoming request for a transaction, process the received incoming request to identify a previously received request for a transaction counter thereto in an attempt to satisfy one or both of the incoming request and the previously received request and generate a result indicative thereof, the transaction processing server designated as the primary instance at least commencing processing of the incoming request prior to each of the other of the plurality of transaction processing servers designated as the backup instance, wherein one or more of the plurality of components of the transaction processing server designated as the primary instance are each configured to communicate the electronic result message indicative of the result of the operation thereof to a corresponding component of each of the other of the plurality of transaction processing servers designated as the backup instance; and
a plurality of fault tolerance processors, each of the plurality of transaction processing servers coupled with one of the plurality of fault tolerance processors, each of the plurality of fault tolerance processors configured to determine that a failure has occurred in the transaction processing server designated as the primary instance and, subsequent thereto, cause one of the other of the plurality of transaction processing servers to be designated as a new primary instance, wherein the one of other of the plurality of transaction processing servers which is designated as the new primary instance is configured to synchronize the current state of each of the plurality of components thereof based on received electronic messages indicative of the result of the operation of the corresponding component of the primary instance, and process any incoming requests not processed by the primary instance before commencing processing of new incoming requests.

2. The system of claim 1, wherein upon receipt of the electronic result message indicative of the result of the operation of the one or more of the plurality of components of the primary instance, the corresponding component of each of the other of the plurality of transaction processing servers designated as the backup instance compares a result of the operation thereof with the result indicated by the received electronic result message to determine whether one of the plurality of components of the one of the plurality of transaction processing servers designated as the primary instance or the corresponding component of each of the other of the plurality of transaction processing servers designated as the backup instance is operating correctly.

3. The system of claim 1, wherein only the one of the plurality of transaction processing servers designated as the primary instance is configured to transmit a data message indicative of the generated result of the attempt to satisfy one or both of the incoming request and the previously received request to a recipient external to the system.

4. The system of claim 1, wherein each of the plurality of fault tolerant processors periodically receives a communication from others of the plurality of fault tolerant processors, wherein a failure to receive the communication from one of the plurality of fault tolerant processors is deemed to indicate a failure of the transaction processing server coupled therewith.

5. The system of claim 1, wherein each of the plurality of components of each of the plurality of transaction processing servers are further coupled with the one of the plurality of fault tolerance processors coupled with that transaction processing server such that the one of the plurality of fault tolerance processors is able to detect a failure of any of the plurality of components.

6. The system of claim 1, wherein the current state of each of the plurality of components of each of the other of the plurality of transaction processing servers designated as the backup instance corresponds to a state of each of the plurality of components of the one of the plurality of transaction processing servers designated as the primary instance subsequent to the processing of an electronic transaction message preceding the electronic transaction message currently being processed by the one of the plurality of transaction processing servers designated as the primary instance.

7. The system of claim 1, wherein the plurality of fault tolerance processors, establish, upon the plurality of transaction processing servers starting up, which of the plurality of transaction processing servers is designated as the primary instance.

8. The system of claim 1,
wherein each of the other of the plurality of transaction processing servers designated as the backup instance includes a queue configured to store previously received electronic messages from the one of the plurality of transaction processing servers designated as the primary instance, and
wherein the one of the plurality of transaction processing servers which is designated as the new primary instance is configured to process all of the previously received electronic messages stored in the queue before becoming the new primary instance.

9. The system of claim 8,
wherein the electronic message indicative of the result of the operation of the one of the plurality of transaction processing servers designated as the primary instance includes a primary result output, and
wherein the electronic message indicative of the result of the operation of each of the other of the plurality of transaction processing servers designated as the backup instance includes a backup result output.

10. The system of claim 9, wherein at least a subset of the plurality of components of the one of other of the plurality of transaction processing servers designated as the new primary instance are configured to complete a reconciliation of the backup result output with the primary result output.

11. The system of claim 9, wherein at least a subset of the plurality of components of the one of other of the plurality of transaction processing servers designated as the new primary instance are configured to identify a backup result output that does not have a respective primary result output and publish an unmatched result output via a shared memory architecture.

12. The system of claim 1, wherein when the one of the plurality of fault tolerance processors coupled with the primary instance determines that the failure has occurred in the primary instance, each of the plurality of fault tolerance processors is configured to cause the primary instance to at least de-couple from the other of the plurality of transaction processing servers.

13. The system of claim 1,
wherein a first component of the plurality of components comprises a transaction receiver processor for receiving the electronic message via the electronic communications network, the electronic message including data indicative of an order to trade,
wherein a second component of the plurality of components comprises a transaction processor for matching the received order to trade with one or more of previously received unmatched orders which are counter thereto, and
wherein a third component of the plurality of components comprises a result generator processor for generating and publishing a market data message.

14. A computer implemented method comprising:
providing a plurality of transaction processing servers coupled with each other via an electronic communications network each of the plurality of transaction processing servers comprising a processor;
implementing, by the processor of each of the plurality of transaction processing servers, a plurality of components coupled with each other, each of the plurality of components characterized by a current state and configured to perform one or more of receiving an electronic message, processing the received electronic message and generating an electronic result message indicative of a result of an operation which may alter the current state thereof, wherein one of the plurality of transaction processing servers is designated as a primary instance and each other of the plurality of transaction processing servers is designated as a backup instance, wherein each of the plurality of transaction processing servers is operative to receive an incoming request for a transaction, process the received incoming request to identify a previously received request for a transaction counter thereto in an attempt to satisfy one or both of the incoming request and the previously received request and generate a result indicative thereof, the transaction processing server designated as the primary instance at least commencing processing of the incoming request prior to each of the other of the plurality of transaction processing servers designated as the backup instance, wherein one or more of the plurality of components of the transaction processing server designated as the primary instance are each configured to communicate the electronic result message indicative of the result of the operation thereof to a corresponding component of each of the other of the plurality of transaction processing servers designated as the backup instance;
determining, by a plurality of fault tolerance processors, each of the plurality of fault tolerance processors coupled with one transaction processing server of the plurality of transaction processing servers, that a failure has occurred in the transaction processing server designated as the primary instance;

causing, by the plurality of fault tolerance processors, one of the other of the plurality of transaction processing servers to be designated as a new primary instance;

synchronizing, by the transaction processing server which is designated as the new primary instance, the current state of each of the plurality of components thereof based on received electronic messages indicative of the result of the operation of the corresponding component of the primary instance; and processing, by the transaction processing server, any incoming requests not processed by the primary instance before commencing processing of new incoming requests.

15. The method of claim 14, wherein upon receipt of the electronic result message indicative of the result of the operation of the one or more of the plurality of components of the primary instance, the corresponding component of each of the other of the plurality of transaction processing servers designated as the backup instance compares a result of the operation thereof with the result indicated by the received electronic result message to determine whether one of the plurality of components of the one of the plurality of transaction processing servers designated as the primary instance or the corresponding component of the other of the plurality of transaction processing servers designated as the backup instance is operating correctly.

16. The method of claim 14, further comprising:
transmitting, by only the one of the plurality of transaction processing servers designated as the primary instance, a data message indicative of the generated result of the attempt to satisfy one or both of the incoming request and the previously received request to an external recipient.

17. The method of claim 14, further comprising:
receiving periodically, by each of the plurality of fault tolerant processors, a communication from others of the plurality of fault tolerant processors, wherein a failure to receive the communication from one of the plurality of fault tolerant processors is deemed to indicate a failure of the transaction processing server coupled therewith.

18. The method of claim 14, wherein each of the plurality of components of each of the plurality of transaction processing servers are further coupled with the one of the plurality of fault tolerance processors coupled with that transaction processing server such that the one of the plurality of fault tolerance processors is able to detect a failure of any of the plurality of components.

19. The method of claim 14, wherein the current state of each of the plurality of components of each of the other of the plurality of transaction processing servers designated as the backup instance corresponds to a state of each of the plurality of components of the one of the plurality of transaction processing servers designated as the primary instance subsequent to the processing of an electronic transaction message preceding the electronic transaction message currently being processed by the one of the plurality of transaction processing servers designated as the primary instance.

20. The method of claim 14, further comprising:
establishing, by the plurality of fault tolerance processors, upon the plurality of transaction processing servers starting up, which of the plurality of transaction processing servers is designated as the primary instance.

21. The method of claim 14,
wherein each of the other of the plurality of transaction processing servers designated as the backup instance includes a queue configured to store previously received electronic messages from the one of the plurality of transaction processing servers designated as the primary instance, and wherein the one of the other of the plurality of transaction processing servers which is designated as the new primary instance is configured to process all of the previously received electronic messages stored in the queue before becoming the new primary instance.

22. The method of claim 21,
wherein the electronic message indicative of the result of the operation of the one of the plurality of transaction processing servers designated as the primary instance includes a primary result output, and wherein the electronic message indicative of the result of the operation of each of the other of the plurality of transaction processing servers designated as the backup instance includes a backup result output.

23. The method of claim 22, wherein at least a subset of the plurality of components of the one of other of the plurality of transaction processing servers designated as the new primary instance are configured to complete a reconciliation of the backup result output with the primary result output.

24. The method of claim 21, wherein at least a subset of the plurality of components of the one of the other of the plurality of transaction processing servers designated as the new primary instance are configured to identify a backup result output that does not have a respective primary result output and publish an unmatched result output via a shared memory architecture.

25. The method of claim 14, further comprising:
when the one of the plurality of fault tolerance processors coupled with the primary instance determines that the failure has occurred in the primary instance, causing, by each of the plurality of fault tolerance processors, the primary instance to at least de-couple from the other of the plurality of transaction processing servers.

26. The method of claim 14,
wherein a first component of the plurality of components comprises a transaction receiver processor for receiving the electronic message via the electronic communications network, the electronic message including data indicative of an order to trade, wherein a second component of the plurality of components comprises a transaction processor for matching the received order to trade with one or more of previously received unmatched orders which are counter thereto, and wherein a third component of the plurality of components comprises a result generator processor for generating and publishing a market data message.

27. A system comprising:
means for providing a plurality of transaction processing servers coupled with each other via an electronic communications network;

means for implementing a plurality of components of each of the plurality of transaction processing servers, coupled with each other, each of the plurality of components characterized by a current state and configured to perform one or more of receiving an electronic message, processing the received electronic message and generating an electronic result message indicative of a result of an operation which may alter the current state thereof, wherein one of the plurality of transaction processing servers is designated as a primary instance and each other of the plurality of transaction processing servers is designated as a backup instance, wherein each of the plurality of transaction processing servers is operative to receive an incoming request for a transaction, process the received incoming request to identify a previously received request for a transaction counter thereto in an attempt to satisfy one or both of the incoming request and the previously received request and generate a result indicative thereof, the transaction processing server designated as the primary instance at least commencing processing of the incoming request prior to each of the other of the plurality of transaction processing servers designated as the backup instance, wherein one or more of the plurality of components of the transaction processing server designated as the primary instance are each configured to communicate the electronic result message indicative of the result of the operation thereof to a corresponding component of each of the other of the plurality of transaction processing servers designated as the backup instance;

means for determining that a failure has occurred in the transaction processing server designated as the primary instance;

means for causing one of the other of the plurality of transaction processing servers to be designated as a new primary instance;

means for synchronizing the current state of each of the plurality of components thereof based on received electronic messages indicative of the result of the operation of the corresponding component of the primary instance; and means for processing any incoming requests not processed by the primary instance before commencing processing of new incoming requests.

* * * * *